(12) United States Patent
Adams et al.

(10) Patent No.: US 9,820,556 B2
(45) Date of Patent: Nov. 21, 2017

(54) SYSTEM FOR STORING, ORGANIZING, AND TRANSPORTING PORTABLE ITEMS

(71) Applicant: XPANSION GEAR, LLC, Denver, CO (US)

(72) Inventors: Joshua David Adams, Denver, CO (US); Steve Replin, Denver, CO (US)

(73) Assignee: Xpansion Gear, LLC, Denver, CO (US)

( * ) Notice: Subject to any disclaimer, the term of this patent is extended or adjusted under 35 U.S.C. 154(b) by 0 days.

(21) Appl. No.: 15/152,123

(22) Filed: May 11, 2016

(65) Prior Publication Data

US 2016/0367017 A1 Dec. 22, 2016

Related U.S. Application Data

(60) Provisional application No. 62/180,187, filed on Jun. 16, 2015.

(51) Int. Cl.
| | |
|---|---|
| *A45F 3/10* | (2006.01) |
| *A45F 3/08* | (2006.01) |
| *A45F 3/04* | (2006.01) |
| *A45F 3/14* | (2006.01) |
| *A45C 13/02* | (2006.01) |
| *F16B 1/00* | (2006.01) |

(52) U.S. Cl.
CPC .............. *A45F 3/14* (2013.01); *A45C 13/02* (2013.01); *A45F 3/08* (2013.01); *A45F 3/10* (2013.01); *A45C 2013/026* (2013.01); *A45F 3/04* (2013.01); *A45F 2003/146* (2013.01); *A45F 2003/148* (2013.01); *F16B 2001/0028* (2013.01); *F16B 2001/0035* (2013.01)

(58) Field of Classification Search
CPC .. A45F 3/04; A45F 3/042; A45F 3/047; A45F 3/06; A45F 3/08; A45F 3/10
See application file for complete search history.

(56) References Cited

U.S. PATENT DOCUMENTS

| | | | | |
|---|---|---|---|---|
| 4,263,951 A | * | 4/1981 | Siegel | A45C 3/06 150/106 |
| 4,848,624 A | * | 7/1989 | Clem | A45C 1/04 224/222 |

(Continued)

*Primary Examiner* — Justin Larson
(74) *Attorney, Agent, or Firm* — James A. Sheridan; Sheridan Law, LLC

(57) ABSTRACT

The disclosure provides systems and methods of use pertaining to the storage, organization, and transport of portable items typically carried within a bag, backpack, suitcase or other luggage item, or that are typically transported by an individual person. The system includes a number of storage and structure containers, each designed to enclose one or more portable items. The storage and structure containers may be loaded upon a loadable baseplate along with individual portable items and functionality components and, in turn, either inserted into an existing bag for transport or attached to a wearable frame having a shoulder harness and a wearable baseplate to function as a standalone system. The loadable baseplate may include many additional features, including light and/or sound-emitting components, location-tracking components, and/or other powered or passive functionality. Other embodiments are also disclosed.

20 Claims, 22 Drawing Sheets

(56) References Cited

U.S. PATENT DOCUMENTS

| | | | | |
|---|---|---|---|---|
| 4,934,573 A * | 6/1990 | Jaeger | A45F 3/08 224/153 |
| 5,044,537 A | 9/1991 | Bufalo | |
| 5,240,156 A * | 8/1993 | Sicotte | A41F 9/002 224/148.5 |
| 5,501,379 A * | 3/1996 | Munoz | A41F 9/002 224/240 |
| 5,535,797 A * | 7/1996 | Martindale | A45C 13/02 150/111 |
| 5,604,958 A * | 2/1997 | Anscher | A45C 7/0086 224/197 |
| 5,628,443 A * | 5/1997 | Deutsch | A45C 7/0086 150/113 |
| 5,639,005 A * | 6/1997 | Chouinard | A41D 15/04 224/580 |
| 5,685,591 A * | 11/1997 | Simplicean | B60R 11/02 224/275 |
| 5,704,528 A * | 1/1998 | Faure | A45C 7/0063 150/105 |
| 5,715,978 A * | 2/1998 | Ackeret | B60P 7/0815 224/310 |
| 5,724,707 A * | 3/1998 | Kirk | A41D 13/0012 2/102 |
| 5,729,869 A * | 3/1998 | Anscher | A45C 7/0086 224/272 |
| 5,732,867 A * | 3/1998 | Perkins | A45F 3/08 224/271 |
| 5,806,740 A * | 9/1998 | Carlson | A45F 3/047 224/259 |
| 5,833,095 A * | 11/1998 | Russell | A45F 5/02 206/373 |
| 5,836,489 A * | 11/1998 | Swetish | A45F 3/10 224/262 |
| 5,845,780 A * | 12/1998 | Allen | A45C 3/00 190/110 |
| 5,991,925 A * | 11/1999 | Wu | A41D 13/0012 2/102 |
| 6,138,883 A * | 10/2000 | Jackson | B60R 9/00 224/404 |
| 6,626,342 B1 * | 9/2003 | Gleason | A45F 3/08 224/633 |
| 6,851,735 B2 * | 2/2005 | Hicks | B60R 7/02 224/281 |
| 6,857,820 B2 * | 2/2005 | Jacoway | B63C 11/02 224/627 |
| 6,948,599 B2 | 9/2005 | Rodrigue et al. | |
| 7,025,203 B2 * | 4/2006 | Schonenbach | F41C 33/06 206/315.11 |
| 7,124,921 B1 * | 10/2006 | Hubbell | A45F 3/04 224/148.2 |
| 7,200,871 B1 * | 4/2007 | Carlson | A41D 13/0012 2/102 |
| 7,703,645 B2 * | 4/2010 | Moskun | A45F 3/08 224/579 |
| 7,828,457 B2 | 11/2010 | Davidoff et al. | |
| 8,182,439 B2 * | 5/2012 | Glenn | A45F 3/14 224/637 |
| 8,209,769 B1 * | 7/2012 | Ellis | F41C 33/00 2/2.5 |
| D691,792 S * | 10/2013 | Robert | D3/216 |
| 8,584,917 B2 * | 11/2013 | Hexels | A45F 3/08 2/102 |
| 8,776,291 B1 * | 7/2014 | Lewis | A61G 1/044 224/156 |
| 8,997,262 B2 * | 4/2015 | Klein | A45F 3/06 2/108 |
| 9,161,610 B2 * | 10/2015 | Hexels | A45F 3/08 |
| 9,232,848 B2 * | 1/2016 | Krikorian | A45F 3/08 |
| 2003/0057246 A1 * | 3/2003 | Painter | A45F 3/08 224/637 |
| 2004/0245300 A1 * | 12/2004 | Geller | A45F 5/10 224/257 |
| 2005/0098510 A1 | 5/2005 | Lom et al. | |
| 2005/0145663 A1 * | 7/2005 | Samuels | A01K 97/06 224/575 |
| 2006/0283906 A1 * | 12/2006 | Laughton | A45C 11/38 224/583 |
| 2007/0017942 A1 * | 1/2007 | Hubbell | A45F 3/04 224/148.2 |
| 2007/0152007 A1 * | 7/2007 | Kauss | A45F 3/14 224/637 |
| 2007/0159808 A1 | 7/2007 | Chen | |
| 2008/0135142 A1 | 6/2008 | Ellis | |
| 2009/0321481 A1 * | 12/2009 | Licausi | A45F 3/047 224/262 |
| 2013/0126566 A1 * | 5/2013 | Seuk | A45F 5/00 224/223 |
| 2013/0180992 A1 | 7/2013 | Viau | |
| 2013/0261521 A1 * | 10/2013 | Carter | A61F 5/022 602/19 |
| 2013/0341370 A1 * | 12/2013 | Larson | B62B 3/1428 224/411 |
| 2014/0151424 A1 * | 6/2014 | Hexels | A45F 3/06 224/637 |
| 2015/0208791 A1 * | 7/2015 | Klein | A45F 3/08 224/633 |
| 2015/0327658 A1 * | 11/2015 | Swan | A45F 5/00 224/660 |
| 2015/0330294 A1 * | 11/2015 | Golad | F02B 63/048 290/1 A |
| 2016/0009229 A1 * | 1/2016 | Davis | A45F 5/02 224/191 |

* cited by examiner

SYSTEM FOR STORING, ORGANIZING, AND TRANSPORTING PORTABLE ITEMS

REFERENCE TO PENDING PRIOR PATENT APPLICATION

The application claims the benefit under 35 U.S.C. 119(e) of U.S. Provisional Patent Application No. 62/180,187, filed Jun. 16, 2015, by Joshua David Adams and Steve Replin for "SYSTEM FOR ORGANIZING AND TRANSPORTING PERSONAL OR COMMERCIAL ITEMS," which patent application is hereby incorporated herein by reference.

BACKGROUND

Generally, a bag, backpack, purse, carrying case, briefcase or attaché case, equipment and/or supply container, suitcase, or another luggage item for human and/or animal use (hereinafter and collectively a "bag") is used to encompass and transport a myriad of transportable or portable items of varying sizes to be carried inside the bag. Such items may include a vast array of items for personal, commercial, medical, and/or deployment/military use, including, by way of limited example, clothing, toiletries, beauty supplies, outdoor gear, batteries, camera equipment, office supplies, paper goods, books, electronic devices and supplies, food and/or beverages, utensils, identification items, money, medical supplies and equipment, first aid supplies and equipment, and much more. Currently, "built-in organizers" and/or "organizer inserts" are used to organize these portable items. These types of existing organizers generally involve reconfiguring and replicating other features normally found on or in the original bags.

For example, existing "built-in" organizers are often formed of stretchable loops and/or soft fabric with mesh or material pockets and pouches having zippered or flapped closures on the interior and/or exterior of the bag. An example of this type of built-in organizer is shown in prior art FIG. 1A. In addition, elastic bands are often fastened at both ends of a bag's interior and used to retain contents in place during transport. Built-in organizers are sewn, attached, or adhered to the bags themselves, as is the case with mesh pockets built into the walls of a pack and retaining elastic bands fastened at both ends of a bag's interior.

Organizer "inserts" typically feature soft pouches and/or pockets sewn or attached to portable rectangular sections of foam or other semi-soft materials used in the construction of a typical bag. FIGS. 1B-1D illustrate several exemplary organizer inserts that exist in the prior art. Similar to built-in organizers, the pockets and pouches of organizer inserts are not adjustable and cannot be reorganized to fit a user's needs. In addition, due to their diminutive size in comparison to the interior volume of an average bag, organizer inserts often become a component of clutter within an already disorganized space as the organizer shifts in transport.

A "wall divider" provides another type of existing organizer insert, an example of which is shown in prior art FIG. 1E. Wall dividers are typically formed of sections of padded foam laid perpendicular to each other such that the sections combine to frame a number of cutouts suited to receive and separate particular items, often camera equipment such as lenses and camera body housings. The wall divider is placed within the interior of the bag, perpendicular to the bag's walls. Despite segmenting or dividing the larger interior of the bag into smaller spaces for the purposes of bag organization and item management, this option doesn't provide a fully stable storage structure for high-end items such as camera equipment.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a gear management system for organizing and transporting transportable items. The gear management system may include a plurality of storage and structure containers, where each of the containers may be configured to enclose one or more of the transportable items. The gear management system may also include a loadable baseplate having at least front and back sides, each of the front and back sides configured to receive and retain a customized arrangement of the storage and structure containers along with individual ones of the transportable items.

Another embodiment provides a storage, organization, and transport system. The system may include (1) a loadable baseplate having a plurality of attachment surfaces; (2) a plurality of storage and structure containers, where each of the containers is configured to hold one or more portable items; and (3) a retention system incorporated within the loadable baseplate. The retention system may be configured to removeably connect the storage and structure containers to the attachment surfaces of the loadable baseplate.

Yet another embodiment provides a method of organizing and transporting portable items using a gear management system including a loadable baseplate having a retention system incorporated across a number of attachment surfaces. The method may include (a) enclosing one or more of the portable items within a storage and structure container; (b) using the retention system, removeably affixing the storage and structure container to one of the attachment surfaces of the loadable baseplate; (c) using the retention system, removeably affixing an individual portable item directly to another of the attachment surfaces of the loadable baseplate; and (d) repeating the steps (a), (b), and (c) until all of the portable items are loaded onto the loadable baseplate, thereby forming a loaded baseplate.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to a gear management system for storing, organizing, and transporting a myriad of transportable or portable items that are typically transported within a larger bag, backpack, purse, carrying case, briefcase or attaché case, equipment and/or supply container or carrier, suitcase, or any other luggage item intended for human and/or animal use (hereinafter and collectively referred to as a "bag"). These transportable or portable items may include any items capable of being transported for any appropriate human and/or animal use, including for personal, commercial, medical, and/or deployment or military use. Examples may include, but are not limited to, clothing, toiletries, beauty supplies, outdoor gear, batteries, camera equipment, communication equipment, office supplies, paper goods, books, electronic devices and supplies, food and/or beverages, utensils, identification items, money, medical supplies and equipment, first aid supplies and equipment, outdoor or indoor laboratory specimen collections, and much more (hereinafter referred to as "portable items"). The system may also support a number of functionality components designed to improve overall system performance. Such components may include power and power conversion sources such as batteries and solar panels, as well as powered components including lighting, video displays, audio speakers, communication devices, and more, along with passive components such as embedded reflective surfaces or other luminescent features (hereinafter and collectively referred to as "functionality components"). The system discussed below provides a protective, customizable, modular solution for storing, organizing, and transporting portable items. The system may be either enclosed for transport within a larger bag or attached directly to a wearable baseplate and worn standalone by a user.

Figure 1A:
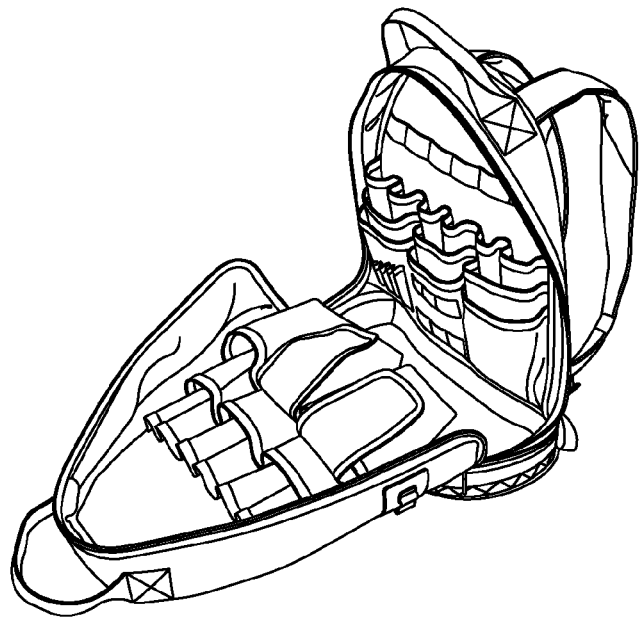
FIGS. 1A-1E illustrate various perspective views of examples of "built-in" and "insert" type bag organizers that exist in the prior art.
Figure 1B:
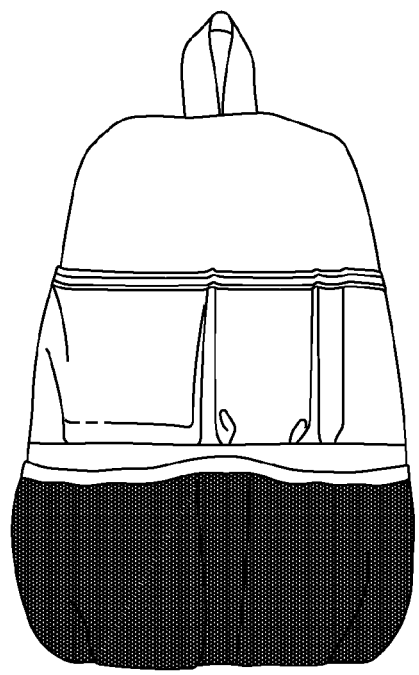
Figure 1C:
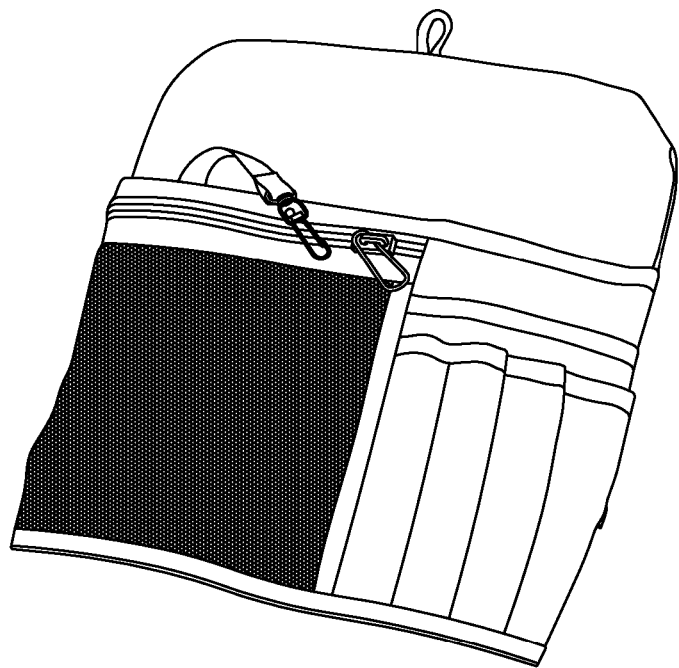
Figure 1D:
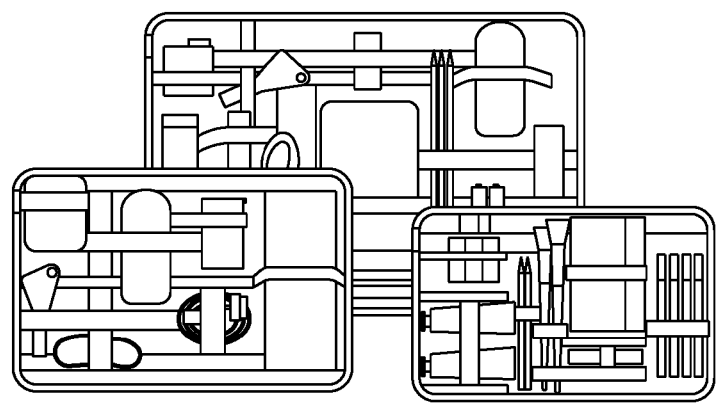
Figure 1E:
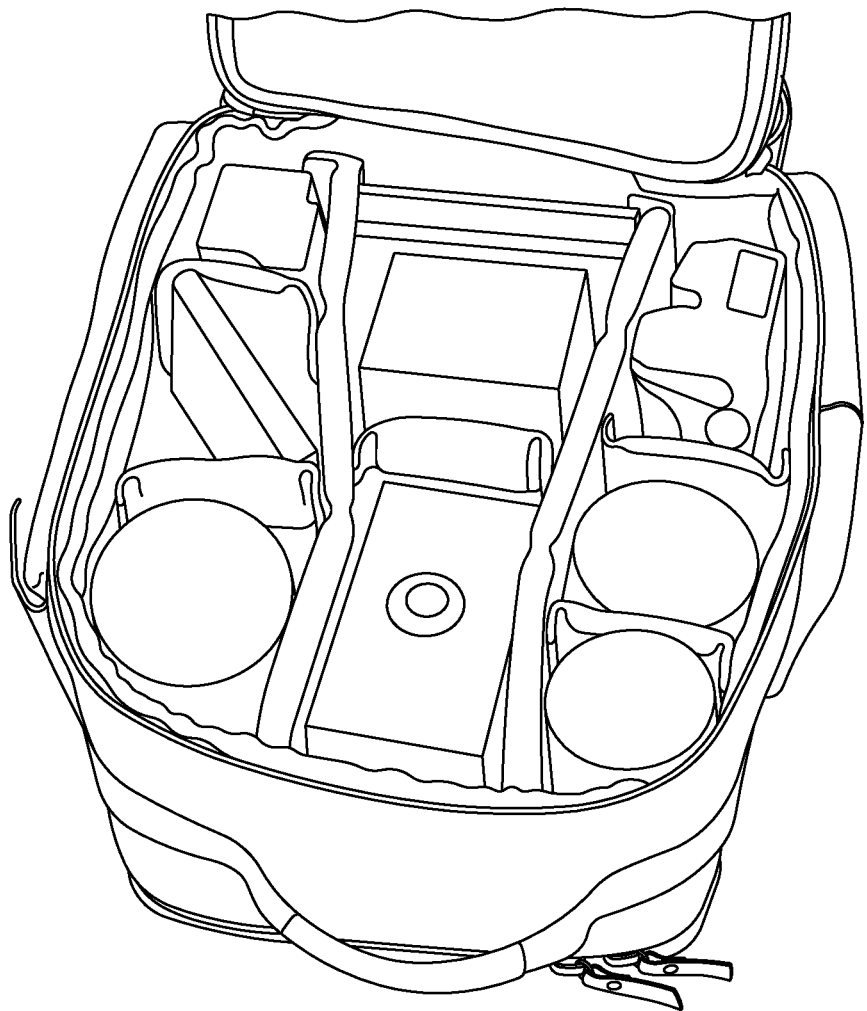
Figure 2:
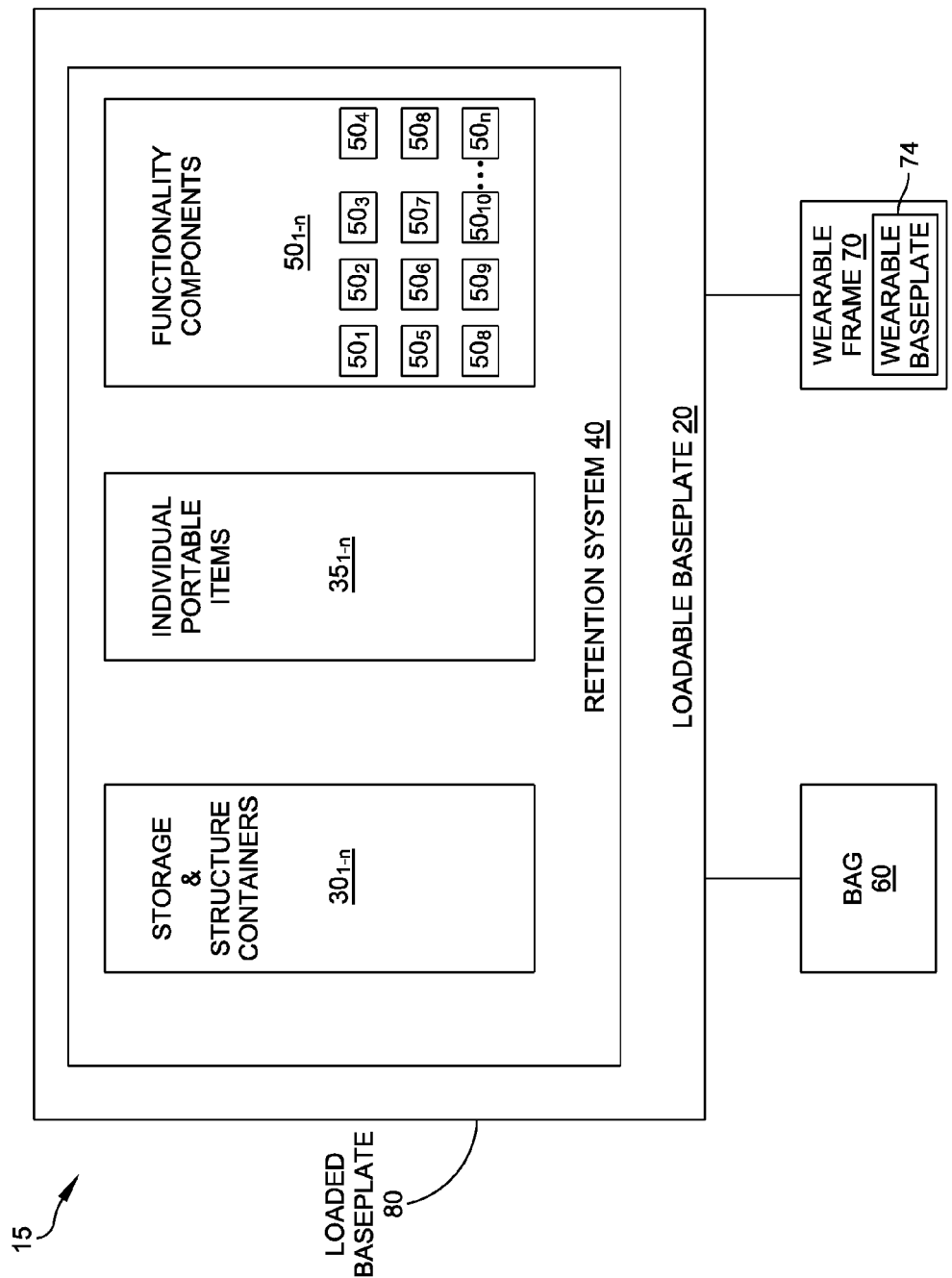
FIG. 2 illustrates a block diagram summarizing one embodiment of a gear management system for storing, organizing, and transporting portable items.

Turning to the figures, FIG. 2 shows a block diagram that provides an overview summary of a gear management system 15 for storing, organizing, and transporting a number of portable items $35_{1-n}$. In one embodiment, system 15 includes a loadable baseplate 20 featuring multiple attachment surfaces. Loadable baseplate 20 may act as a base skeleton for additional components and incorporate a retention system 40, which may include a number of retention components, discussed below, that function to attach or secure a variety of storage and structure containers $30_{1-n}$ to the attachment surfaces of loadable baseplate 20. Retention system 40 may also be used to secure individual portable items $35_{1-n}$ to the attachment surfaces, as well as a number of functionality components $50_1$, designed to improve the overall performance and functionality of gear management system 15. Loadable baseplate 20 may be sized and shaped for association with a separate bag 60, such that loadable baseplate 20, when in a loaded configuration including containers $30_{1-n}$, individual portable items $35_{1-n}$, and functionality components $50_{1-n}$, may be placed within an appropriate bag 60 for transport. Alternatively, loadable baseplate 20 may be associated with a wearable baseplate 74 and wearable frame 70 and used standalone without association with any type of separate bag 60, as discussed below in relation to FIGS. 10A-10C.

Figure 3A:
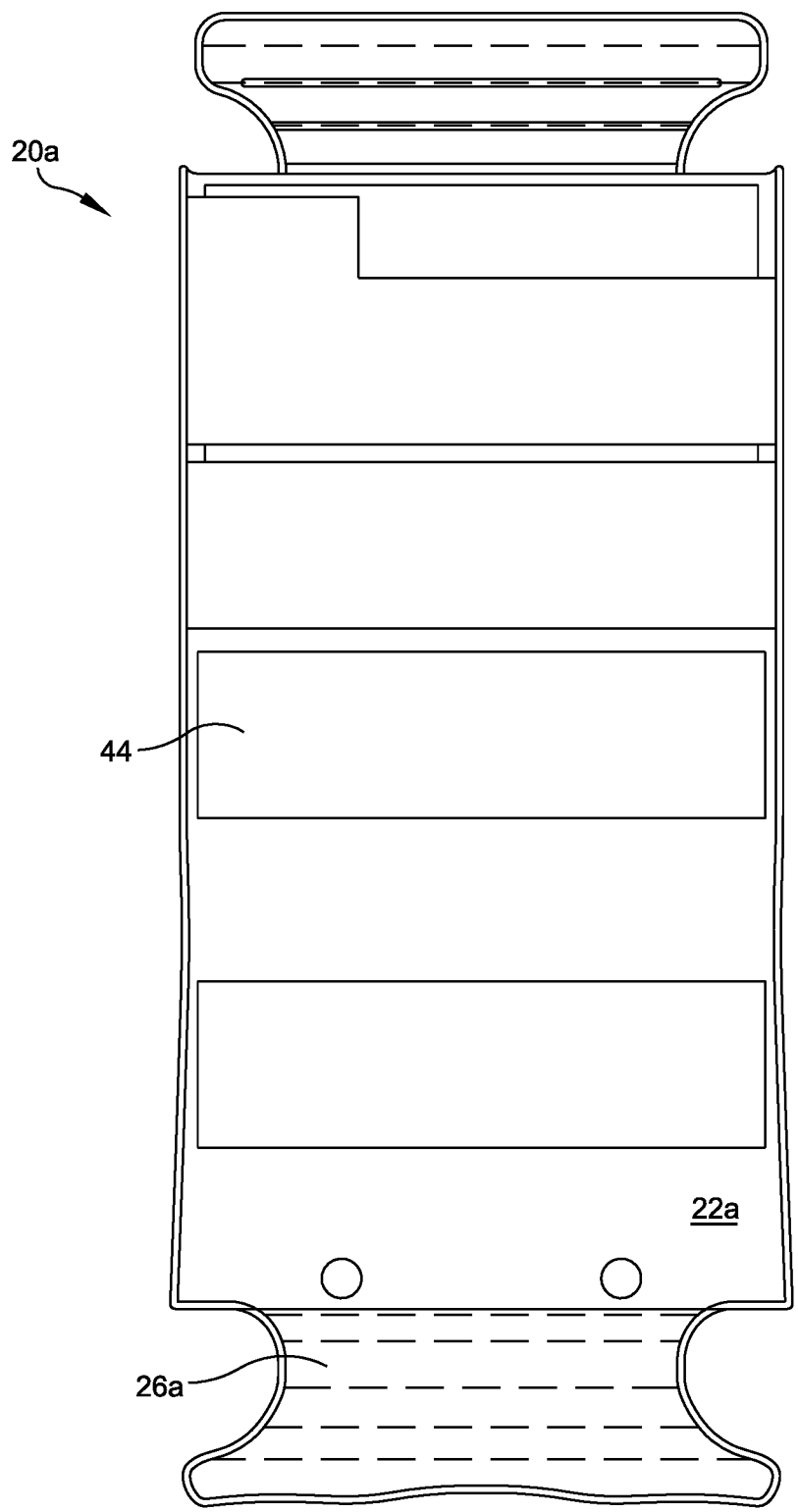
FIGS. 3A-3B illustrate respective front and side views of one exemplary embodiment of a loadable baseplate for the gear management system of FIG. 2.
Figure 3B:
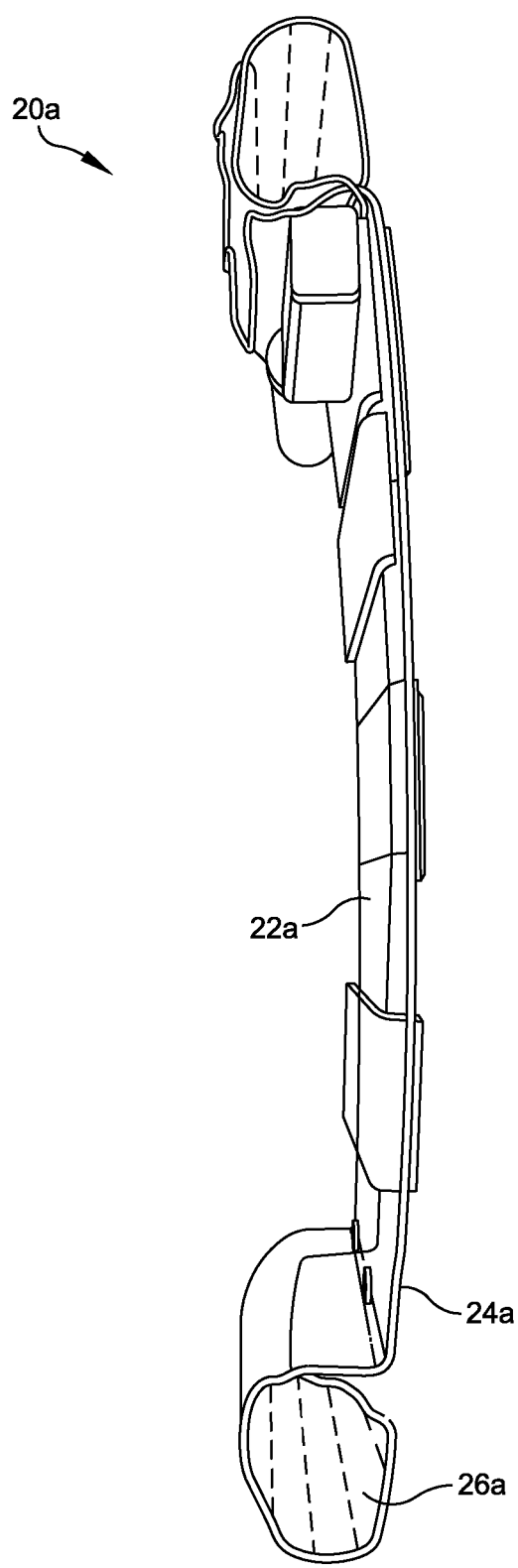

FIGS. 3A-3B illustrate respective front and side views of one embodiment of a loadable baseplate $20_a$ in an unloaded configuration. Embodiments of loadable baseplate $20_a$ provide a foundation or universal platform for the selective or customized loading (i.e., arrangement and attachment) of a number of storage and structure containers $30_{1-n}$, as well as a number of individual portable items $35_1$, and functionality components $50_{1-n}$. In this embodiment, baseplate $20_a$ may include a number of attachment surfaces including a front surface $22_a$, a back surface $24_a$, and one or more retention forms $26_a$ that are designed to receive and retain containers $30_{1-n}$, individual portable items $35_{1-n}$, and/or functionality components $50_{1-n}$ via a mechanical-tension or snap-fit.

Figure 4A:
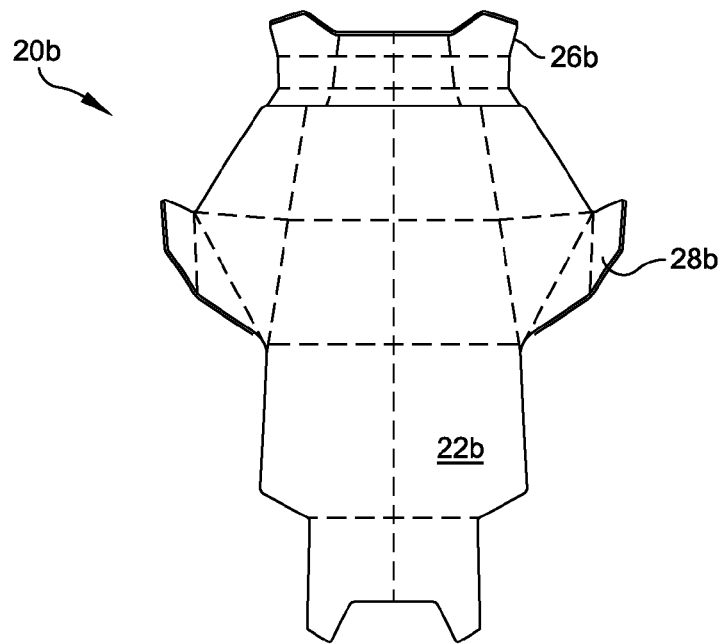
FIGS. 4A-4C illustrate respective front, front-perspective, and rear-perspective views of another exemplary embodiment of a loadable baseplate for the gear management system of FIG. 2.
Figure 4B:
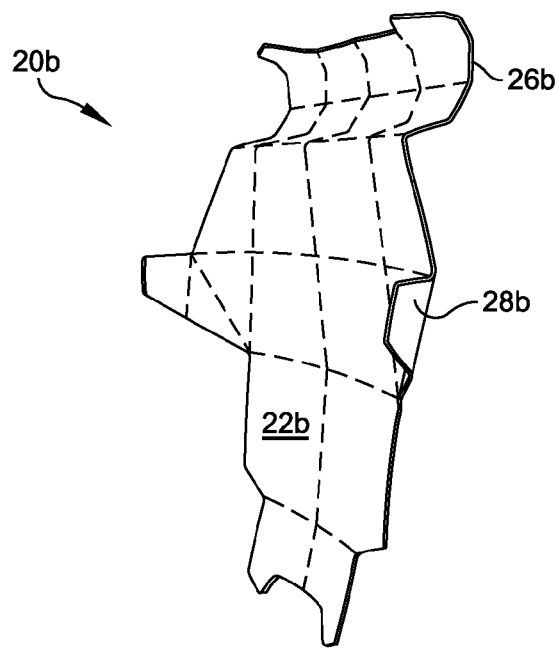
Figure 4C:
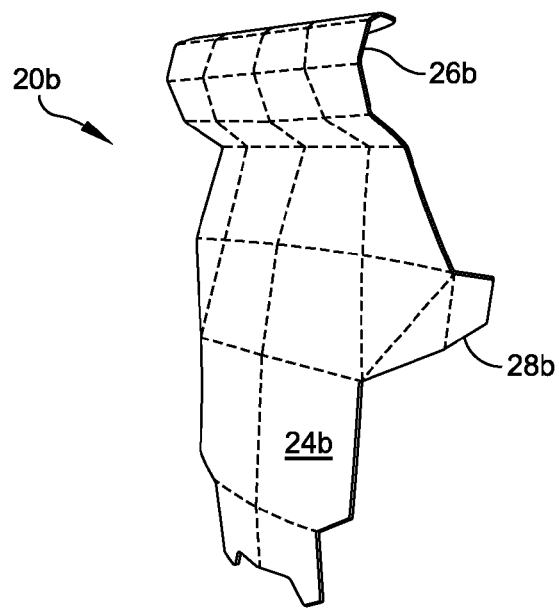

FIGS. 4A-4C illustrate respective front, front-perspective, and rear-perspective views of another embodiment of a loadable baseplate $20_b$ in an unloaded configuration. In this embodiment, baseplate $20_b$ may include numerous attachment surfaces including attachment wings $28_b$, as well as a front surface $22_b$, a back surface $24_b$, and one or more retention forms $26_b$. Attachment wings $28_b$ may protrude at an angle from front surface $22_b$ and provide additional attachment surfaces for containers $30_{1-n}$, individual portable items $35_{1-n}$, and or functional components $50_{1-n}$. Attachment wings $28_b$ may also provide additional impact protection for items stored against front surface $22_b$ and/or serve as a kick-stand or leverage device to elevate baseplate $20_b$ into an upright or angled position when at rest.

Figure 5A:
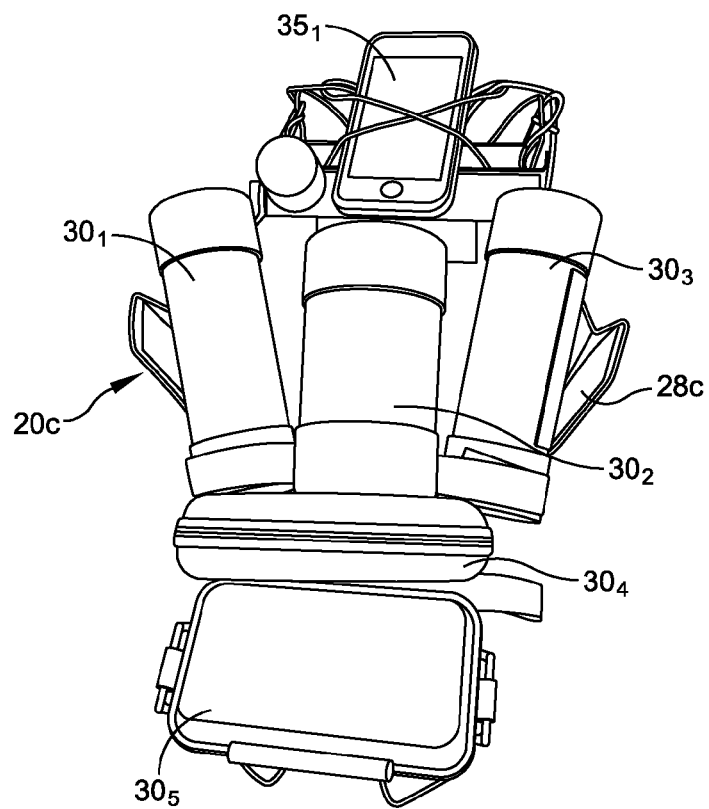
FIGS. 5A-5C illustrate respective perspective, front, and rear views of another exemplary embodiment of a loadable baseplate for the gear management system of FIG. 2 in a loaded configuration.
Figure 5B:
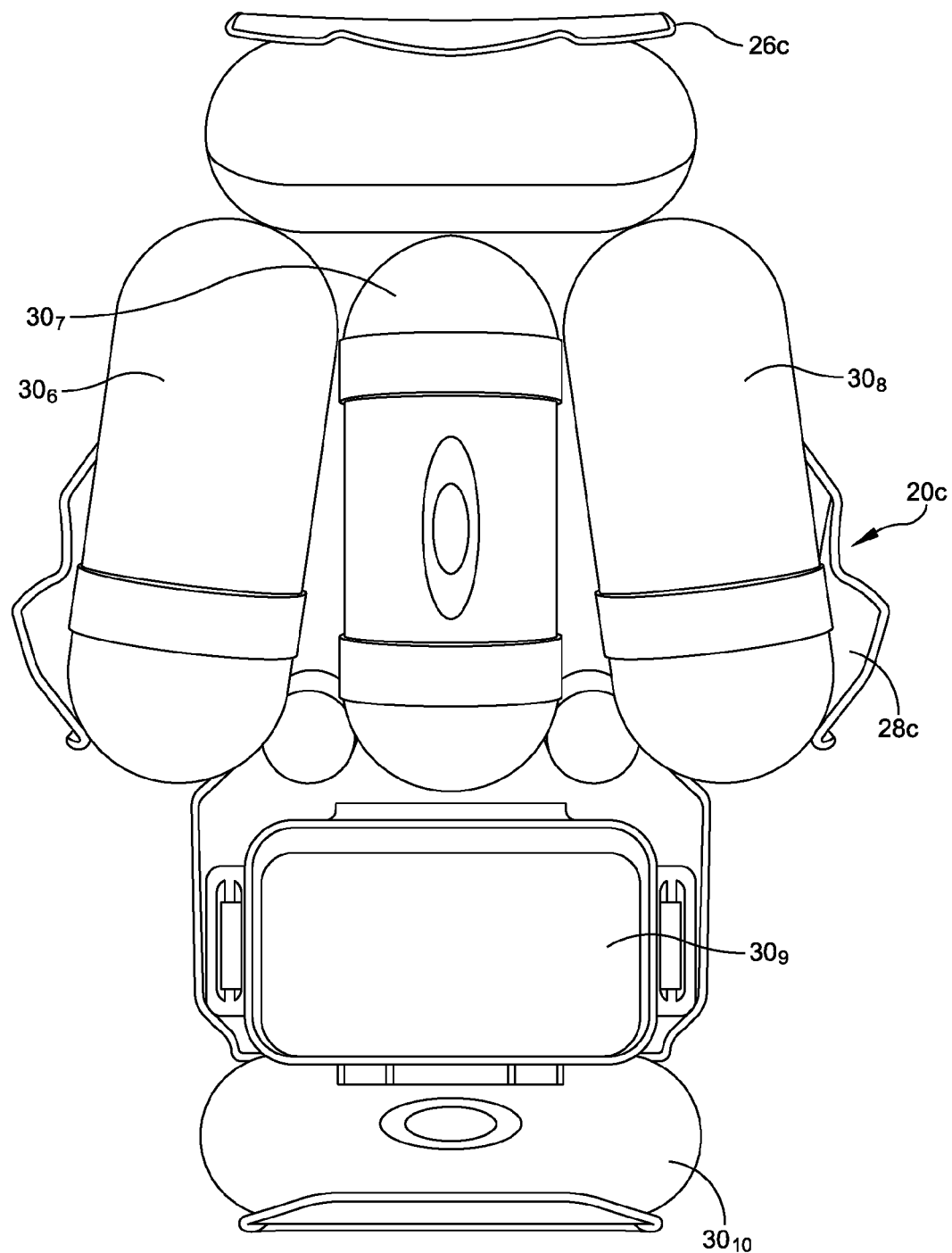
Figure 5C:
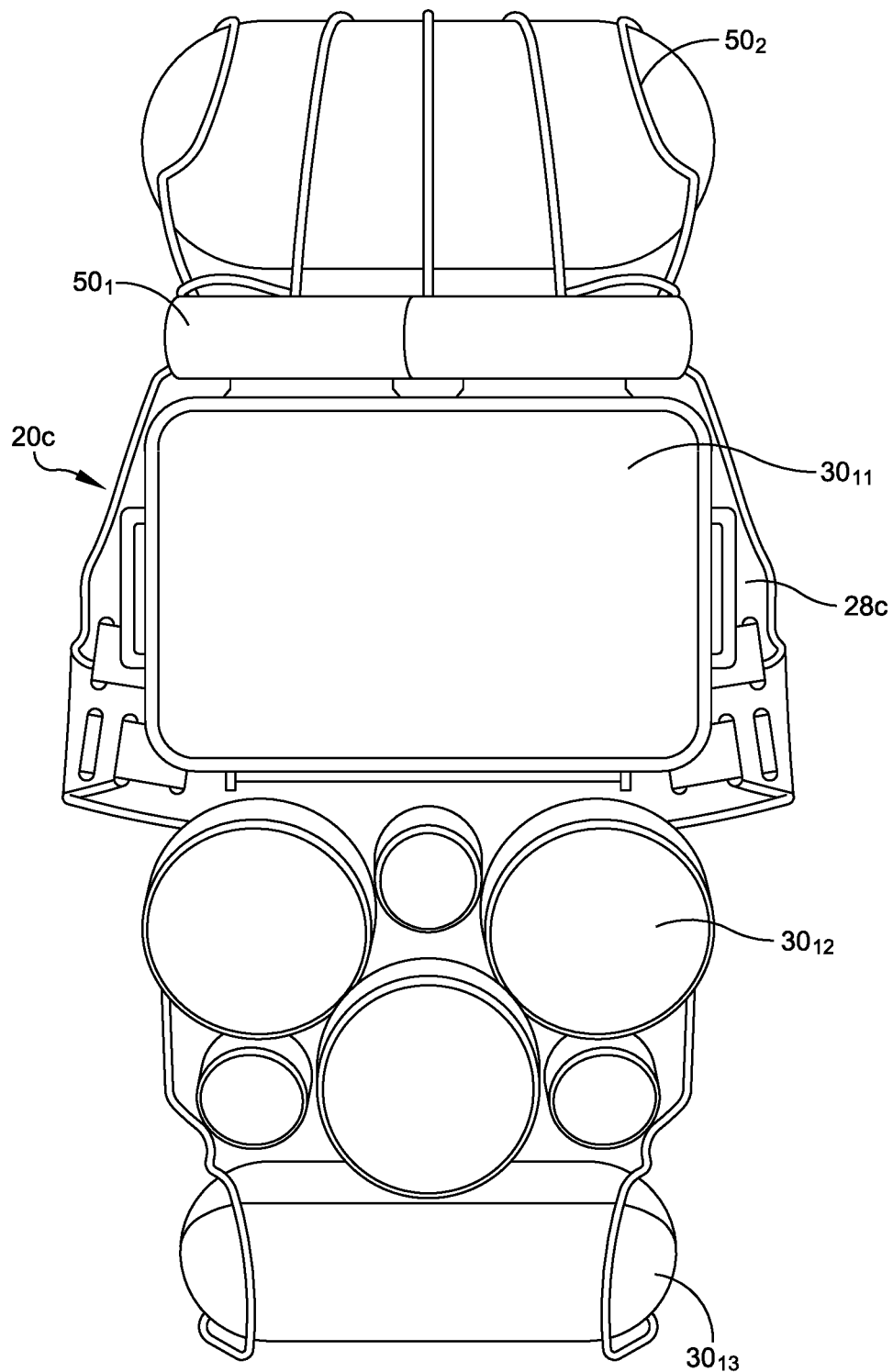

FIGS. 5A-5C illustrate respective perspective, front, and rear views of another embodiment of a loadable baseplate $20_c$ in a loaded configuration in which numerous storage and structure containers $30_{1-n}$, as well as a number of individual portable items $35_{1-n}$ and functionality components $50_{1-n}$ have been attached to baseplate $20_c$ via a retention system 40, discussed below. In this embodiment, loadable baseplate $20_c$ may include retention forms $26_c$ and attachment wings $28_c$. As shown in FIG. 5A, attachment wings $28_c$ provide added protection for containers $30_{1-n}$ attached therebetween. Additional items—either containers $30_{1-n}$, portable items $35_{1-n}$, and/or functional components $50_{1-n}$—may be attached to attachment wings $28_c$ as desired and/or appropriate.

Embodiments of the baseplate may have any appropriate size, shape, and/or configuration necessary to best accommodate a desired number or size range of storage and structure containers $30_{1-n}$, individual portable items $35_{1-n}$, and/or functionality components $50_{1-n}$. Embodiments of loadable baseplate 20 may be formed using any appropriate scalable manufacturing method suitable for plastics such as polycarbonate and the like. These techniques may include, for example, thermoforming, injection molding, and stamp molding. In one embodiment, loadable baseplate 20 may be formed from a polycarbonate sheet such as, for example, a Lexan® sheet having a thickness of 0.093 inches. The polycarbonate sheet may be shaped using a hand-held rotary tool (e.g., a Dremel® tool) equipped with a tapered high-grade steel, high-speed cutting bit. The edges of loadable baseplate 20 may be sanded smooth before retention forms 26 are thermoformed using a heat gun (e.g., a 1200-watt/10-amp heat gun) and basic industrial shapes, such as metal pipes, cylinders, and/or other forms.

Additionally, embodiments of loadable baseplate 20 may vary in size and shape based on intended use. For example, in some instances baseplate 20 will be sized and shaped to fit within a purse or carrying case. In others, it will be sized and shaped to fit within a backpack, suitcase, and/or other larger bag. In still others, baseplate 20 may function in a standalone manner directly attached to a user's back, as discussed below in relation to FIGS. 10A-10C, and may be sized and shaped as necessary for a user or category of users (e.g., man, woman, child).

As discussed above, loadable baseplate 20 provides a foundation for the arrangement and attachment of individual portable items $35_{1-n}$, as well as storage and structure containers $30_{1-n}$, which are used to enclose select portable items $35_{1-n}$. In this regard, storage and structure containers $30_{1-n}$ act as the building blocks that form a three-dimensional unit, or a loaded baseplate, from loadable baseplate 20. Each storage and structure container $30_{1-n}$ may be a sealable, rigid or semi-rigid hollow container formed of clear or opaque polycarbonate or another plastic or other material, including, but not limited to, a lightweight metal. Containers $30_{1-n}$ may be any appropriate size and/or shape, including, for example, cylindrical, square, rectangular, round, oblong, and so on. In one embodiment, one or more containers $30_{1-n}$ may incorporate a slit-top lid, such as various sizes of Viewtrainer® standard series slit-top plastic containers, available at www.ViewTrainer.com.

As discussed above in relation to FIG. 2, loadable baseplate 20 may also serve to anchor functionality components $50_{1-n}$ designed to improve overall system performance. That is, baseplate 20 may incorporate power and power-conversion sources $50_1$ (e.g., RadioShack® Power Inverter) configured to power a number of features. These powered functionality components may include electroluminescent wire (e.g., RadioShack® EL wire) $50_2$ (FIG. 5C) or other lighting elements that are adhered, clipped, fastened, or otherwise attached to an edge of baseplate 20. This type of incorporated light-emitting technology may provide safe internal illumination for bags as well as highly-visible external illumination for safety and better access to the contents placed within storage and structure containers $30_{1-n}$ and/or attached directly to baseplate 20. Other powered technology onboard loadable baseplate 20 may include portable speakers $50_3$ or other audio/video displays $50_4$, recharging stations $50_5$, GPS transmitters $50_6$, Wi-Fi and/or Bluetooth receivers $50_7$, sound emitters or sirens $50_8$, heating and/or cooling components $50_9$, and/or any other useful or desired functionality components.

In one embodiment, the powered elements onboard loadable baseplate 20 may be programmed to receive and respond to various external signals. For example, the baseplate 20 may receive, via Wi-Fi or Bluetooth, a signal from an elementary school and activate the light-emitting technology integrated within baseplate 20 to flash pedestrian-crossing lights visible to oncoming traffic at crosswalks. In another example, a user could activate an SOS or distress signal flasher or siren. Powered functionality components $50_{1-n}$ may be hardwired or integrated components in which the power source is permanently affixed to baseplate 20. In this instance, powered devices may plug into the onboard power source. Alternatively, batteries or another power supply may be loaded onto baseplate 20 similar to any other portable item $35_{1-n}$.

While some functionality components $50_{1-n}$ may be actively powered, other functionality components may be passive, such as, for example, reflective portions $50_{10}$ formed from reflective tape and/or reflective spray.

Figure 6A:
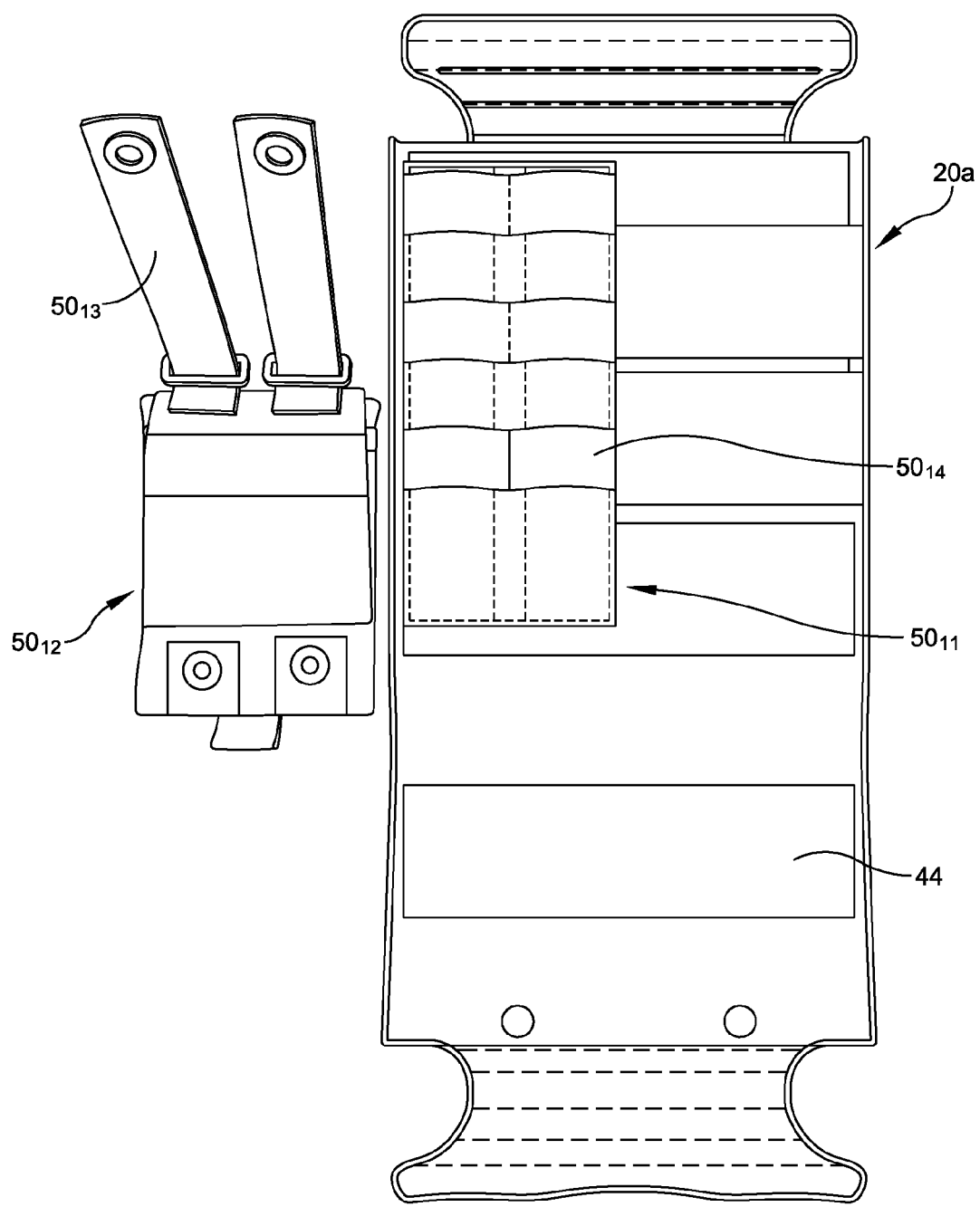
FIGS. 6A-6B illustrate front views of the loadable baseplate of FIGS. 3A-3C in progressive stages of being loaded with a third-party functionality component.
Figure 6B:
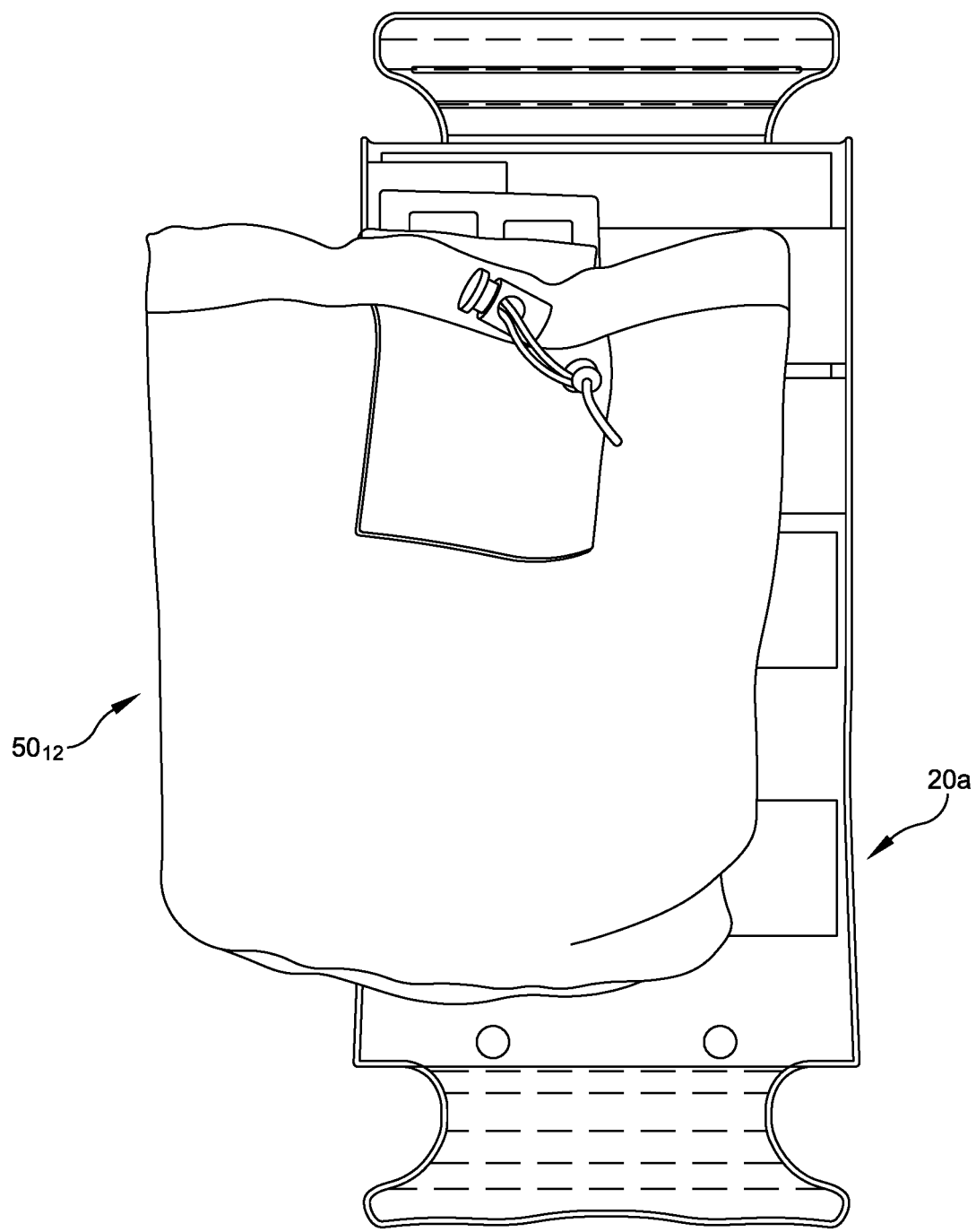

Functionality components $50_{1-n}$ may also include components integrated from third-party gear management systems such as, for example, Modular Lightweight Load-carrying Equipment ("MOLLE") and/or the Pouch Attachment Ladder System ("PALS"), which are often utilized in military, law-enforcement, and/or other deployment environments/applications. Such integration may be preconfigured at the manufacturer or configured by the user when loading loadable baseplate 20. FIGS. 6A-6B demonstrate the progressive integration of these types of third-party functionality components. Specifically, FIGS. 6A-6B illustrate respective detached and attached views of loadable baseplate $20_a$ (FIGS. 3A-3B) equipped with a loop side of a hook-and-loop fastener component, discussed below. A 5.11 Tactical® PALS panel $50_{11}$ may include a corresponding hook side of the hook-and-loop fastener component, such that panel $50_{11}$ may be affixed to loadable baseplate $20_a$. A 5.11 Tactical® MOLLE drop pouch $50_{12}$ may include snap-enabled nylon strips $50_{13}$ configured to slide through a set of corresponding nylon loops $50_{14}$ on panel $50_{11}$ and snap into place about loops $50_{14}$, securing drop pouch $50_{12}$ to panel $50_{11}$. Once secured, drop pouch $50_{12}$ may be accessed and/or utilized, as shown in FIG. 6B. This ability to incorporate components of third-party gear management systems allows gear management system 15 to electively incorporate elements of other systems, such as pouches, pockets, and/or dividers formed of flexible or non-rigid materials, into the environmentally-protective and impact-resistant system 15.

Figure 7A:
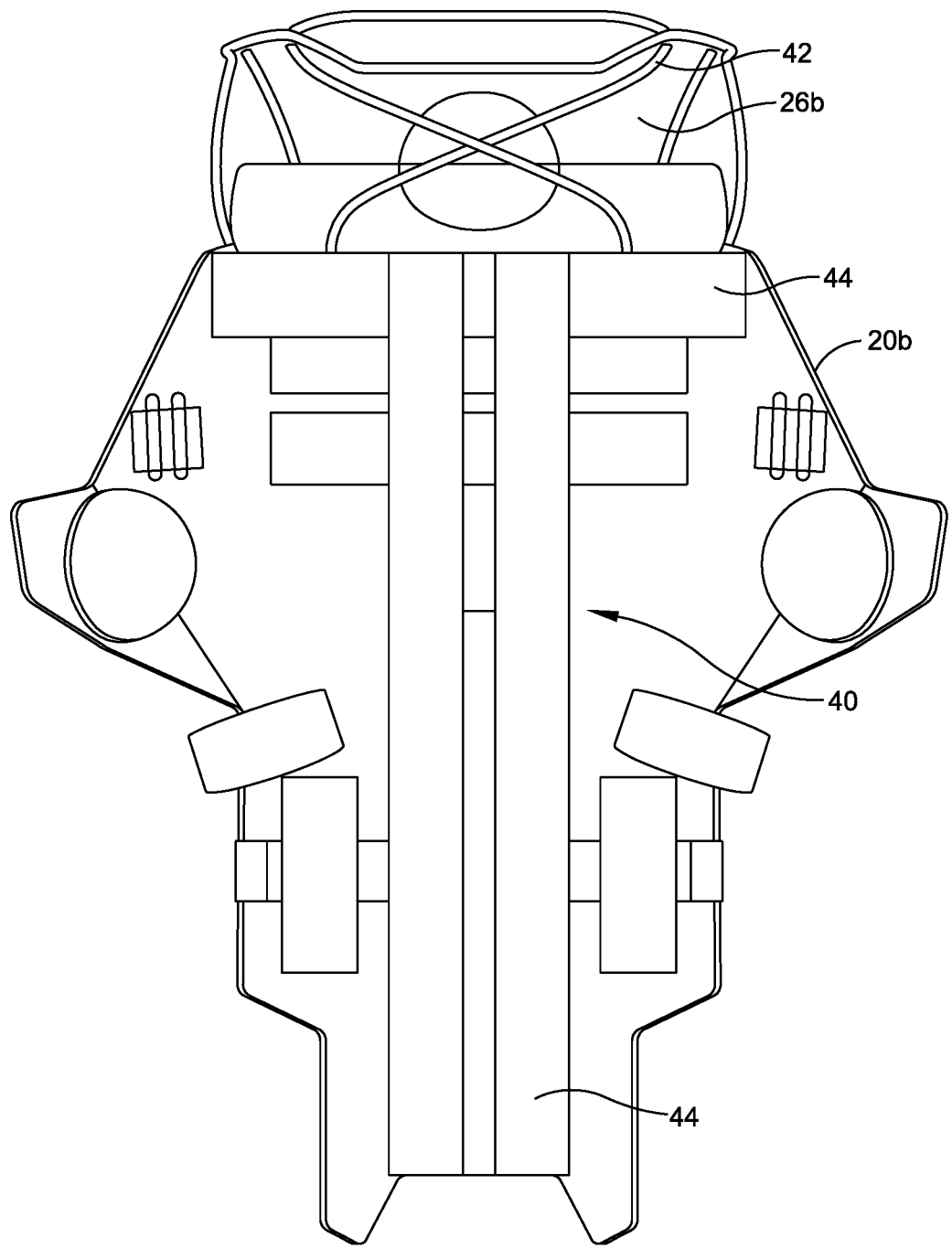
FIGS. 7A-7C illustrate respective front, side, and rear views of one embodiment of a retention system incorporated within the loadable baseplate of FIGS. 4A-4C.
Figure 7B:
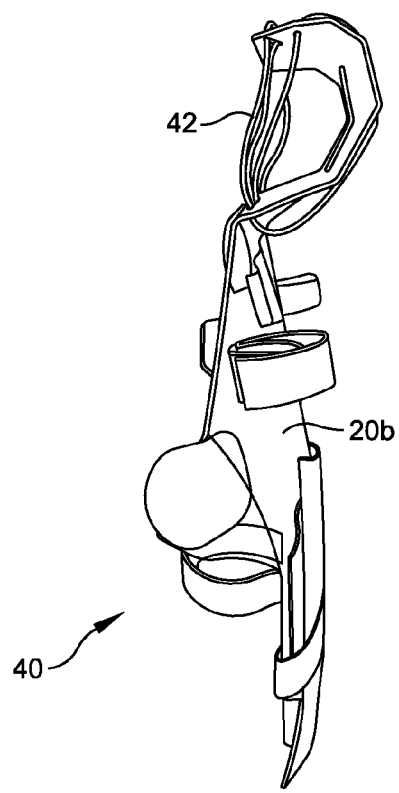
Figure 7C:
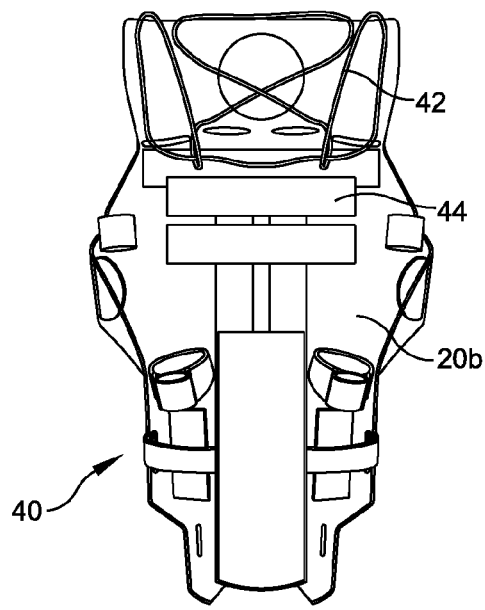

To allow for maximum flexibility in attaching individual portable items $35_{1-n}$, storage and structure containers $30_{1-n}$, and/or functionality components $50_{1-n}$ to loadable baseplate 20, loadable baseplate 20 may incorporate a retention system 40, discussed above in relation to FIG. 2. Retention system 40 may include a number of optional components designed to retain containers $30_{1-n}$, individual portable items $35_{1-n}$, and functionality components $50_{1-n}$ against the attachment surfaces of the baseplate 20. In greater detail, FIGS. 7A-7C illustrate one embodiment of retention system 40 incorporated within baseplate $20_b$ (FIGS. 4A-4C). In this embodiment, retention system 40 may be fitted with segments of elastic cord 42 used to hold either storage and structure containers $30_{1-n}$, portable items $35_{1-n}$, and/or functionality components $50_{1-n}$. Elastic cord segments 42 may be attached to baseplate 20 using any appropriate fastener or they may be strung through pre-drilled holes sized to accommodate cord 42. Retention system 40 may also incorporate a number of hook-and-loop style (i.e., Velcro®) fasteners 44. Each hook-and-loop style fastener strip 44 has a loop side and a hook side. In one embodiment, the loop side may be adhered directly to various portions or quadrants of the attachment surfaces of loadable baseplate $20_b$, as shown in FIGS. 7A-7C and discussed above in relation to FIGS. 6A-6C, while the corresponding hook side may be adhered to one of the containers $30_{1-n}$, an individual portable item $35_{1-n}$, or a functionality component $50_{1-n}$. Hook-and-loop style fastener strips 44 may be cut and applied in any size, shape, and/or configuration to allow for maximum loading flexibility on all of the attachment surfaces of loadable baseplate 20.

Figure 8A:
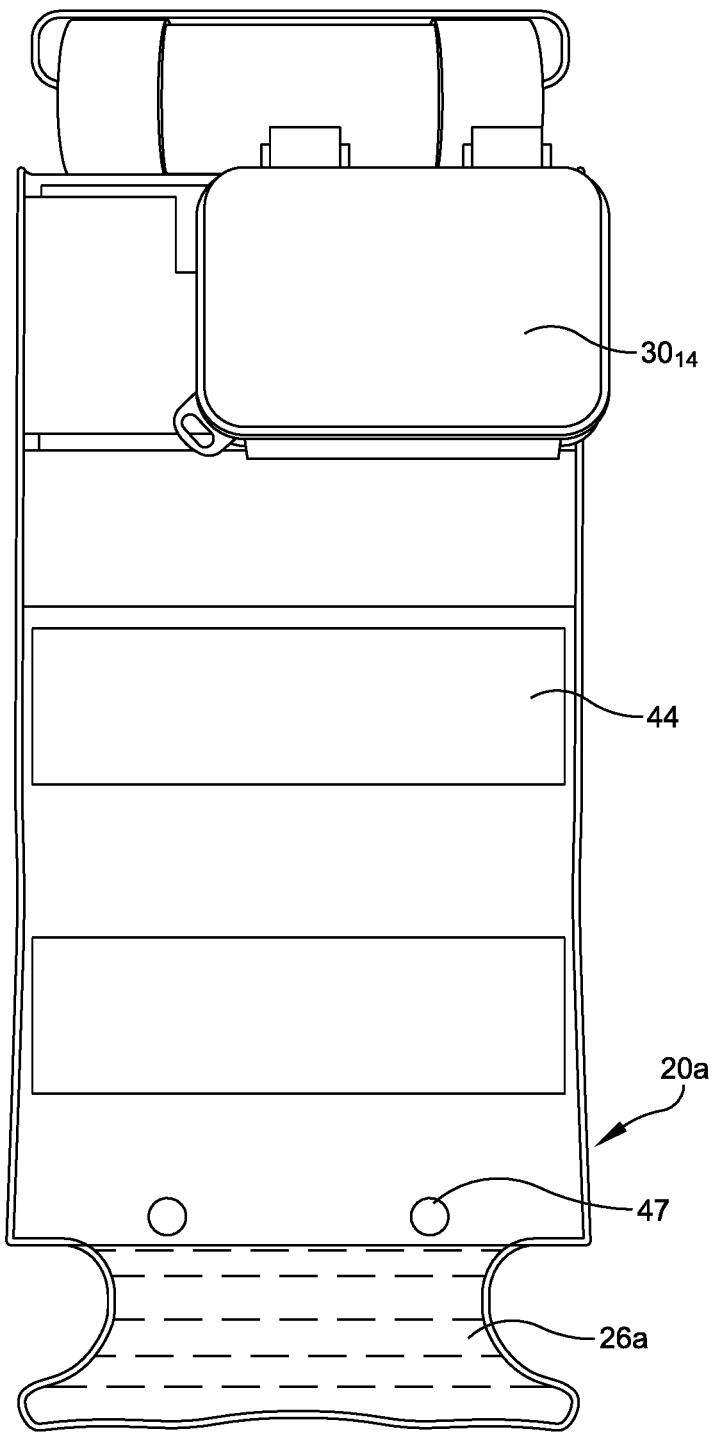
FIG. 8A illustrates a front view of the loadable baseplate of FIGS. 3A-3C in a nearly unloaded configuration.
Figure 8B:
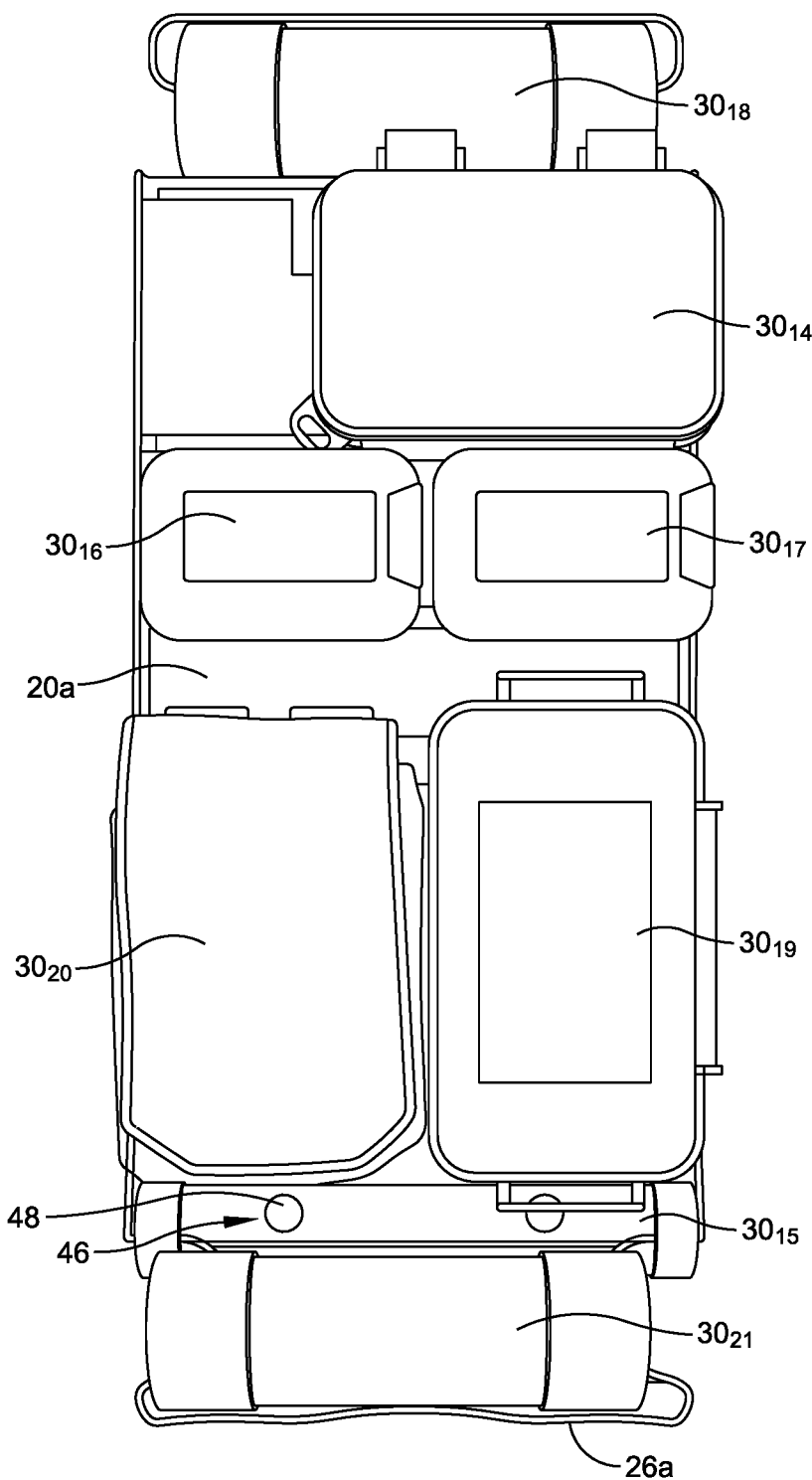
FIG. 8B illustrates a front view of the loadable baseplate of FIG. 8A in a loaded configuration.
Figure 8C:
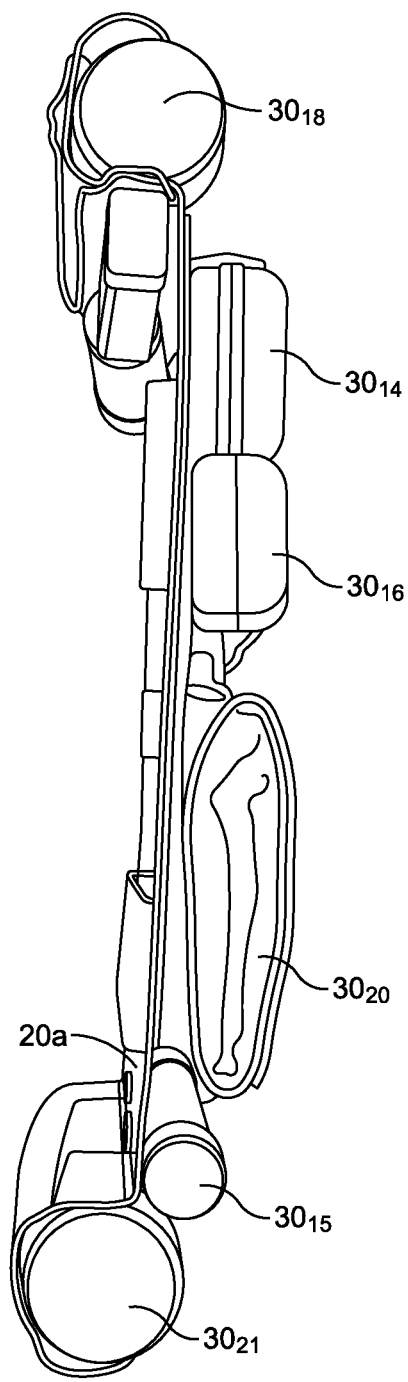
FIG. 8C illustrates a left-side view of the loadable baseplate of FIG. 8A in a partially loaded configuration.
Figure 8D:
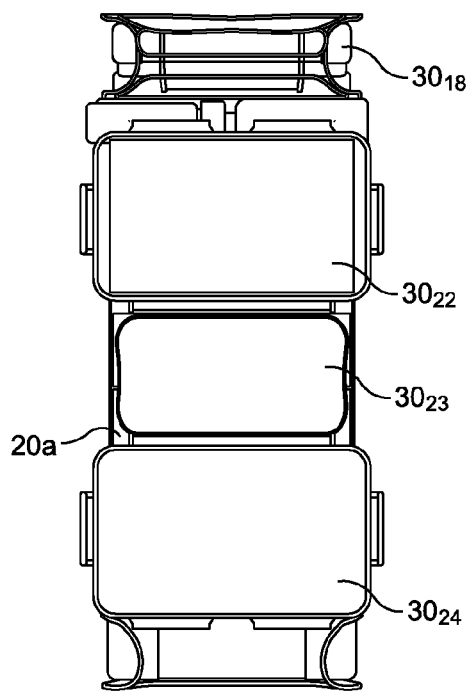
FIGS. 8D-8E illustrate respective rear and left-side views of the baseplate of FIG. 8A in a loaded configuration.
Figure 8E:
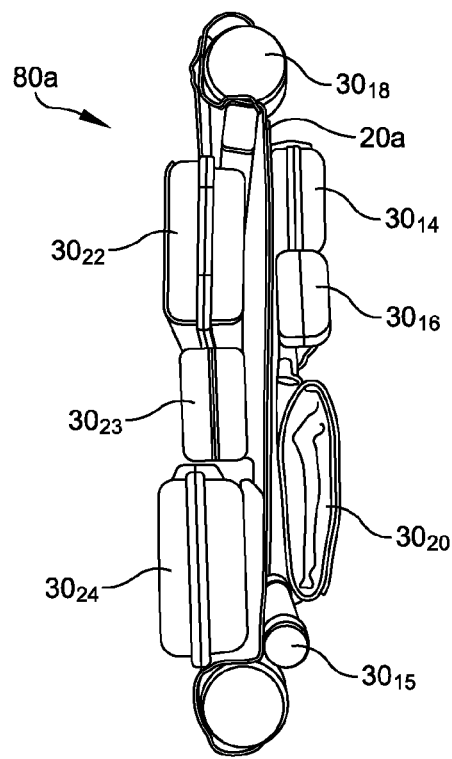

Retention system 40 may also incorporate magnetic portions 46, as shown in FIGS. 8A-8B and in relation to one embodiment of baseplate $20_a$. Similar to hook-and-loop style fastener strips 44, magnetic portions 46 may include two attracting magnets. A first magnet 47 may be adhered or otherwise attached directly to various attachment surfaces of loadable baseplate $20_a$, as shown in FIG. 8A, while a corresponding second magnet 48 may be affixed to one of the containers $30_{1-n}$, as shown in FIG. 8B. Retention forms $26_{a-c}$, which may retain containers $30_{1-n}$ via a mechanical snap-fit may also be considered components of retention system 40, and retention system 40 may incorporate any additional attachment hardware as appropriate and/or necessary, including, for example, carabiners attached to baseplate 20, adhesives, and/or a variety of incorporated and/or detachable fasteners.

To construct a customized, three-dimensional loaded baseplate, a user may fill each container $30_{1-n}$ with one or more portable items $35_{1-n}$ and, using retention system 40, attach the containers $30_{1-n}$, along with individual portable items $35_1$, and/or functionality components $50_{1-n}$, to both sides of loadable baseplate 20 in any desired, customized configuration. In this regard, FIGS. 8A-8E illustrate views of loadable baseplate $20_a$ being progressively loaded from a nearly unloaded configuration (FIG. 8A) to a loaded configuration (FIG. 8E), thereby forming one embodiment of a loaded baseplate $80_a$. Notably, items may be attached to baseplate 20 in a custom configuration that is tailored to accommodate the user's end requirements in terms of the particular items to be transported on baseplate 20 or as determined by a size or configuration of a bag 60 into which loaded baseplate 80 will be placed.

Figure 9:
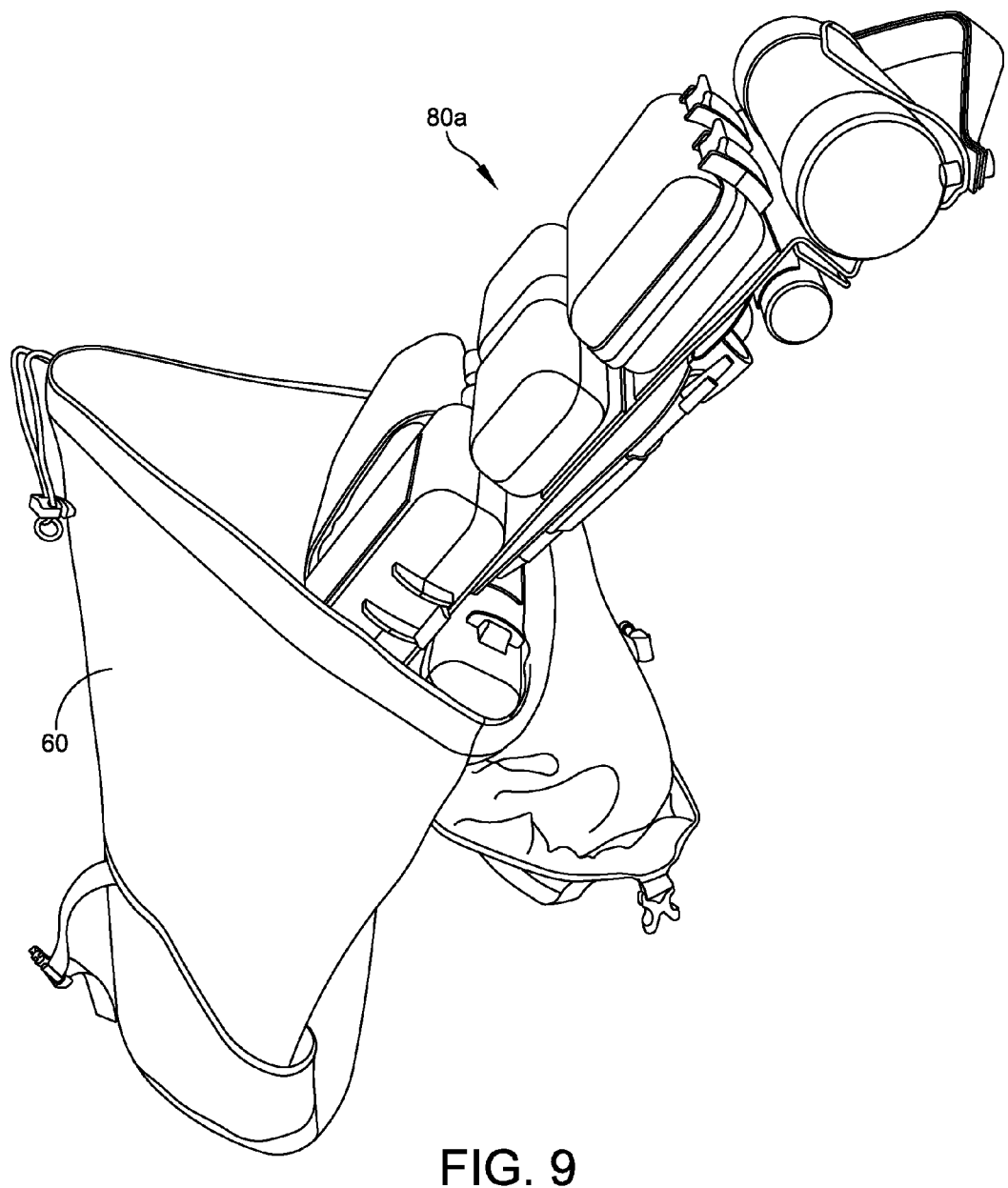
FIG. 9 illustrates a perspective view of the loadable baseplate of FIGS. 3A-3C in a loaded configuration and being loaded into a separate bag for transport.

Loaded baseplate $80_a$ may be used in two different ways. First, loaded baseplate $80_a$ may act as an organizer insert, such that it is placed into and transported within an appropriate bag 60 in a manner that provides internal form and structure to the main interior cargo compartment of the bag, as shown in FIG. 9. Alternatively, loaded baseplate may be directly attached to a wearable frame 70, shown in FIGS. 10A-10C, such that a loaded baseplate $80_c$ (featuring baseplate $20_c$) may act as a stand-alone storage solution. While the progressive loading of baseplate 20 is shown with respect to embodiments of baseplate $20_a$ and $20_c$ it should be understood that any baseplate 20 may be similarly loaded in a desired, customized configuration.

Figure 10A:
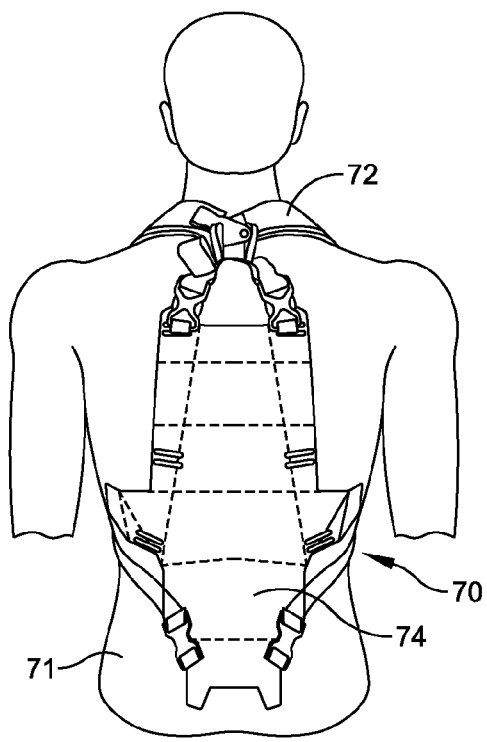
FIGS. 10A-10B illustrate respective rear and perspective views of one embodiment of a wearable frame having a wearable baseplate for supporting embodiments of the loadable baseplate of FIGS. 3A-3C, 4A-4C, and 5A-5C.
Figure 10B:
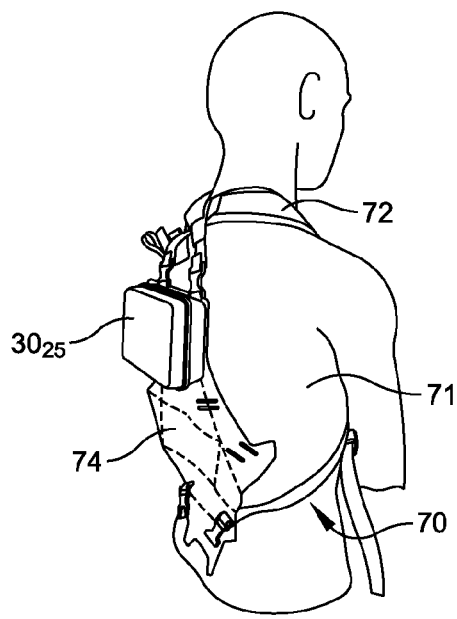

FIGS. 10A-10B illustrate rear and perspective views of wearable frame 70, as affixed to a torso 71 of a mannequin. In one embodiment, wearable frame 70 includes a harness 72 support structure attached to a wearable baseplate 74. Wearable baseplate 74 may be formed of a thin, flexible sheet of polycarbonate or any other appropriate plastic or material, including but not limited to, a lightweight metal. In one embodiment, wearable baseplate 74 may have a shape similar to that of loadable baseplate 20, discussed above, though wearable baseplate 74 may take any appropriate size, shape, and/or configuration to allow it to retain and support embodiments of loaded baseplate 80, as loaded with storage and structure containers $30_{1-n}$, individual portable items $35_{1-n}$, and functionality components $50_{1-n}$.

In one embodiment shown in FIG. 10B, wearable baseplate 74 may itself support one or more storage and structure containers $30_{1-n}$, thereby further increasing the available storage space. FIG. 10B shows a rectangular, hinged storage and structure container $30_{25}$ attached to wearable baseplate 74. Additional containers $30_{1-n}$ may be added as desired and/or appropriate.

Figure 10C:
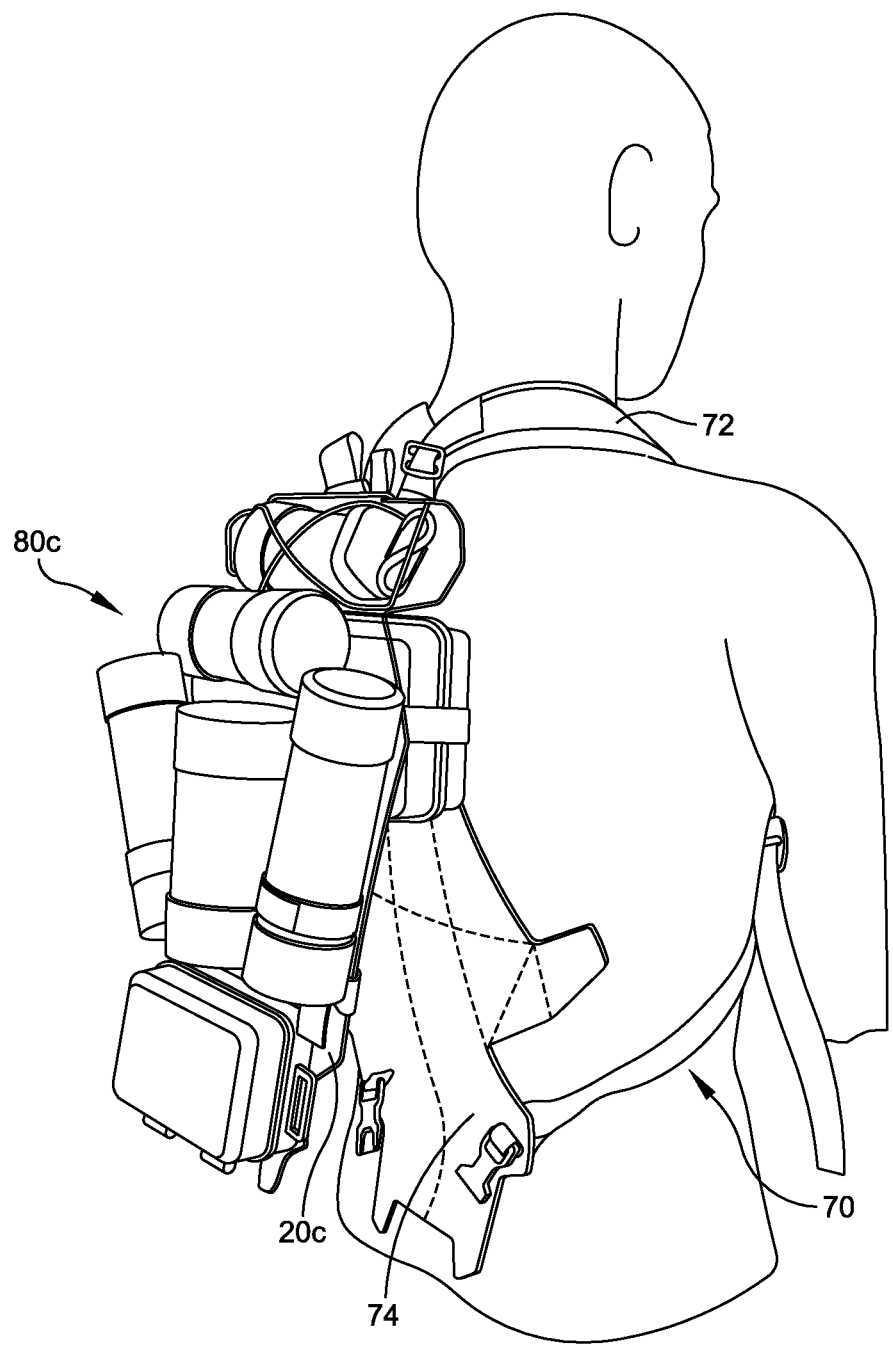
FIG. 10C illustrates a perspective view of the loadable baseplate of FIGS. 4A-4C in a loaded configuration and loaded upon the wearable frame of FIGS. 10A-10B.

Wearable baseplate 74 may include a top slot or other retention mechanism (e.g., fasteners, adhesive, straps, etc.) that allows loadable baseplate 20 to interconnect with or lock into wearable baseplate 74 in a manner that merges loadable baseplate 20/loaded baseplate 80 and wearable baseplate 74 into a stand-alone storage system transported by the user's body via wearable frame 70. FIG. 10C illustrates a perspective view of one embodiment of loaded baseplate $80_c$, as attached to wearable baseplate 74 upon a human torso 71.

In one embodiment, wearable frame 70 may include only harness 72, which may attach directly to loadable baseplate 20/loaded baseplate 80. In this streamlined embodiment, the user may wear loadable baseplate 20/loaded baseplate 80 directly without an intervening wearable baseplate 74.

Figure 11:
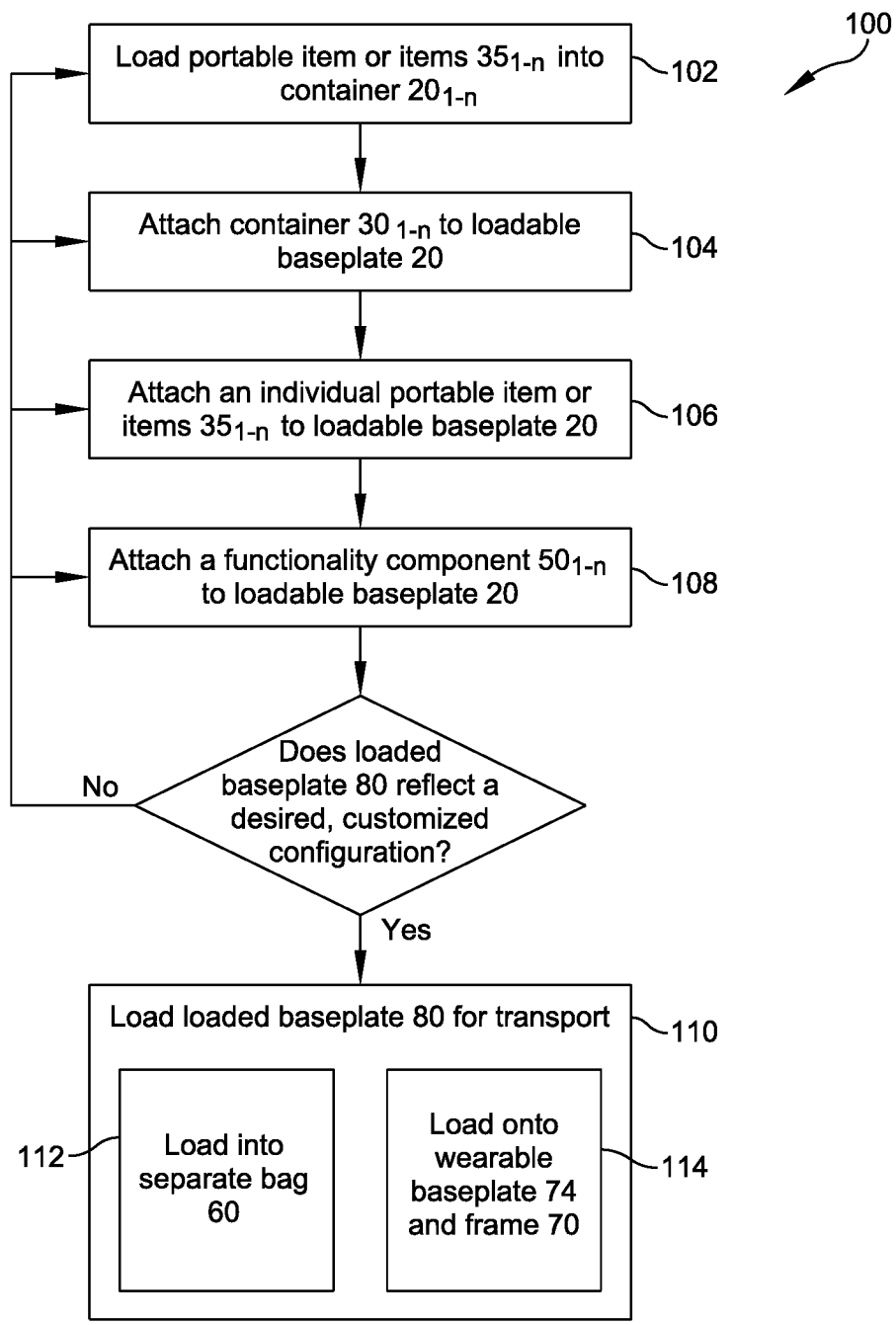
FIG. 11 provides a flow chart depicting an exemplary method of use for the gear management system of FIG. 2.

FIG. 11 provides a flowchart depicting an exemplary method 100 of using embodiments of gear management system 15 (FIG. 2). Method 100 begins with one embodiment of a loadable baseplate 20, a number of portable items $35_{1-n}$, and at least one empty storage and structure container $30_{1-n}$, lid off if applicable (i.e., not a slit-top closure). A user may insert or load (102) a desired portable item or items $35_{1-n}$ into a container $30_{1-n}$ and replace the lid, again if applicable. Next, container $30_{1-n}$ may be attached to loadable baseplate 20 (104) via retention system 40. Attaching (104) container $30_{1-n}$ may involve any appropriate means of attachment, including, for example, attachment via magnetic portion, attachment via loop-and-hook fastener, securing container $30_{1-n}$ via sections of elastic cord, securing container $30_{1-n}$ via a mechanical snap-fit, leveraging an adhesive, a carabiner, or another fastener, or taking advantage of any other appropriate means of attachment to loadable baseplate 20. Next, or at any appropriate time during the completion of method 100, the user may employ retention system 40 to attach one or more individual portable items $35_{1-n}$ (106) via retention system 40 and using any of the attachment means or mechanisms discussed above. The method may also include attaching functionality components $50_{1-n}$ (108) via retention system 40 and using any appropriate attachment means. The steps of loading and attaching containers $30_{1-n}$ (102, 104), as well as attaching individual portable items $35_{1-n}$ (106) and attaching functionality components $50_{1-n}$ (108) to baseplate 20 via retention system 40 may occur in any appropriate order, and each of the steps may be repeated as many times as necessary to achieve a desired, customized configuration of loaded baseplate 80. Once loaded baseplate 80 has is constructed, loaded baseplate 80 may be loaded for transport (110) into a separate bag 60 (112) or onto wearable baseplate 74 and wearable frame 70 (114).

Notably, containers $30_{1-n}$, individual portable items $35_{1-n}$, and functionality components $50_{1-n}$ may be added to any appropriate attachment surfaces of loadable baseplate 20 to facilitate a desired loaded baseplate 80. Once loaded baseplate 80 is assembled, it may be placed within an existing bag 60 for transport or attached to wearable baseplate 74 of frame 70 and worn directly by the user.

Further, once loaded for transport, gear management system 15 may be selectively deconstructed and reconstructed, as desired, to remove/use loaded items and/or to collect additional items. For example, one or more containers $30_{1-n}$ may be removed and replaced as necessary for scientific specimen collection (e.g., plants, insects), or to consume consumable products such as food, water, medical supplies, etc. that are loaded upon baseplate 20.

Bag organizers and organizer inserts that exist in the prior art present several drawbacks as compared to the gear management system described above. Existing organizers don't offer impact resistance or a rigid or even semi-rigid skeleton, framework, housing, or structure capable of protecting and supporting stored items. In almost every case, the incorporation of built-in organizers into the overall structure of the bag makes packing customization difficult, if not impossible. That is, existing bag organizers don't offer impact resistance or other support or protection beyond that afforded by the possible shock absorption of the layers of material forming the pocket, pouch, or the bag walls themselves. They also don't provide robust environmental protection from the pollutants, dust, debris, and moisture or wetness capable of penetrating the organizer's material.

Beyond a lack of support and protection while stored, items cannot be removed from existing built-in or insert organizers without risking total exposure to various types of damage. That is, existing organizers are units that provide an "all or nothing" solution. An item is either (a) stowed away within a built-in organizer attached to the bag or within an organizer insert that holds many items in a non-reconfigurable manner or (b) removed from the organizer and exposed to the elements. Existing bag organizers do not provide a modular solution that allows single items to be removed from the larger organizer while remaining within a protective container.

In sum, existing bags and their corresponding built-in organizers and/or organizer inserts cannot be customized and therefore offer an inefficient packing tool that is often worse than the bare interior of the bag itself. Further, existing fabric and/or foam organizers do not provide sufficient impact and/or physical protection for stored items, either while stored or after being removed from the larger organizer, thereby decreasing the longevity of stored items.

In contrast, gear management system 10 provides a number of benefits over traditional "built-in" or "insert" bag organizers. Rigid or semi-rigid storage and structure containers $30_{1-n}$ provide improved impact resistance over organizers constructed of fabric, foam, and other materials typically used in the construction of bags and existing state-of-the-art organizers. Containers $30_{1-n}$ also provide improved weather, environmental, and damage resistance. Unlike existing fabric and/or foam organizers, each of containers $30_{1-n}$ is sealable (e.g., with a snap-on, screw-on, or hinged lid) or partially sealable (e.g., having a slit-top) and made from a durable plastic such as, for example, silicone, urethane, or rubber (or another material, including but not limited to a lightweight metal) that offers protection from water, ambient moisture, dust, debris, and other environmental factors. The durable, sealable nature of containers $30_{1-n}$ increases the longevity of stored items through decreased potential for mechanical/physical damage and environmental exposure. In addition, unlike a simple bag filled with personal or commercial items, or even a bag containing one or more built-in or insert fabric or foam organizers, the three-dimensional loaded baseplate 80 constructed from loadable baseplate 20, containers $30_{1-n}$, individual portable items $35_{1-n}$, and functionality components $50_{1-n}$ may include a number of functional capabilities, both actively powered and passively functional, that aren't traditionally available in other storage, organization, and transport mechanisms. The opportunity to include lighting, communication and location devices, temperature control devices, and other powered functionalities provides a significant benefit over existing organizers.

System 15 also allows for individualized customization and modularity. Loaded baseplate 80 may be formed by arranging containers $30_{1-n}$, individual portable items $35_{1-n}$, and functionality components $50_{1-n}$ upon loadable baseplate 20 in various, and changeable, configurations. In essence, loadable baseplate 20 provides a nearly universal platform to which containers $30_{1-n}$, individual portable items $35_{1-n}$, and functionality components $50_{1-n}$ may be attached and/or integrated. Moreover, loadable baseplate 20 may be sized to accommodate a wide range of applications, from smaller purses to significantly larger backpacks, suitcases, and duffels, to a stand-alone and wearable option. Instead of picking a bag and forcing portable items to work with or fit within that bag, as is currently the status quo, a user may employ gear management system 15 to fit the requirements of the contents to be stored therein. This allows users to select bags based solely on preferences and/or requirements like style, fit, comfort, and capacity, knowing that preferences and requirements in relation to storage, organization, and functionality can be quickly and easily accommodated through gear management system 15.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A gear management system for storing, organizing, and transporting transportable items, comprising:
a plurality of storage and structure containers, each of the containers configured to enclose one or more of the transportable items;
a loaded baseplate comprising a loadable baseplate having at least front and back sides, each of the front and back sides retaining a customized arrangement of the storage and structure containers;
a carrying mechanism affixed to the loadable baseplate; and
a bag approximating a size of the loaded baseplate, wherein the carrying mechanism enables a user to manually insert the loaded baseplate into, and remove the loaded baseplate from, the bag.

2. The gear management system of claim 1, further comprising a retention system incorporated within the loadable baseplate, the retention system adapted to attach the storage and structure containers to the front and back sides of the loadable baseplate.

3. The gear management system of claim 2, wherein:
the retention system comprises a number of mating hook-and-loop style fastener portions;
each of the fastener portions comprises a loop side and a hook side; and
the loop side is adhered to the loadable baseplate and the hook side is adhered to one of the storage and structure containers.

4. The gear management system of claim 2, wherein the retention system comprises a number of segments of elastic cord threaded through the loadable baseplate.

5. The gear management system of claim 2, wherein the retention system comprises one or more magnetic portions.

6. The gear management system of claim 1, wherein the carrying mechanism comprises a handle.

7. The gear management system of claim 1, wherein the loadable baseplate supports at least one functionality component.

8. The gear management system of claim 7, wherein the functionality component comprises a power source, a border formed of electroluminescent wire, a video display, an audio speaker, or one or more reflective portions.

9. The gear management system of claim 1, wherein the storage and structure containers and the loadable baseplate are rigid.

10. The gear management system of claim 1, further comprising a wearable baseplate frame configured to affix the loaded baseplate to the user's torso, the wearable baseplate frame comprising:
a shoulder harness configured to strap to the user's torso; and
a wearable baseplate having a front side and a back side, the wearable baseplate attached to the shoulder harness and to the loadable baseplate, wherein the front side of the wearable baseplate conforms to a back of the user and the back side of the wearable baseplate is offset from the loadable baseplate.

11. A storage, organization, and transport system, comprising:
a loaded baseplate including:
a loadable baseplate having a plurality of attachment surfaces;
a plurality of storage and structure containers, each of the containers configured to hold one or more portable items; and
a retention system incorporated within the loadable baseplate, the retention system removeably connecting the storage and structure containers to the attachment surfaces of the loadable baseplate, wherein the loaded baseplate is configured for manual transport by a user.

12. The storage, organization, and transport system of claim 11, wherein the retention system comprises:
at least one retention form formed in the loadable baseplate, the retention form configured to receive one or more of the storage and structure containers via a snap-fit;
a number of mating hook-and-loop style fastener portions; and
a number of segments of elastic cord threaded through the loadable baseplate.

13. The storage, organization, and transport system of claim 12, wherein the retention system further comprises a number of magnetic portions.

14. The storage, organization, and transport system of claim 11, further comprising at least one functionality component.

15. The storage, organization, and transport system of claim 14, wherein the functionality component is removeably attached to the loadable baseplate via the retention system.

16. The storage, organization, and transport system of claim 14, wherein the functionality component comprises a battery, a solar panel, a video display, an audio speaker, or one or more luminescent portions.

17. The storage, organization, and transport system of claim 11, further comprising:
a handle affixed to the loadable baseplate; and
a separate bag approximating a size of the loaded baseplate, wherein the carrying mechanism enables the user to manually insert the loaded baseplate into, and remove the loaded baseplate from, the separate bag for manual transport by the user.

18. The storage, organization, and transport system of claim 11, wherein the loaded baseplate directly attaches to a wearable harness for standalone use.

19. A method of organizing and transporting portable items using a gear management system including a loadable baseplate having a retention system incorporated across a number of attachment surfaces, the method comprising:
(a) enclosing one or more of the portable items within a storage and structure container;
(b) using the retention system, removeably affixing the storage and structure container to one of the attachment surfaces of the loadable baseplate;
(c) using the retention system, removeably affixing an individual portable item directly to another of the attachment surfaces of the loadable baseplate;
(d) repeating the steps (a), (b), and (c) until all of the portable items are loaded onto the loadable baseplate, thereby forming a loaded baseplate;
(e) manually transporting the loaded baseplate via each of a separate bag sized to receive the loaded baseplate and a wearable harness configured to affix the loaded baseplate to a user's torso.

20. The method of claim 18, wherein the loadable baseplate includes a handle, and wherein the manually transporting the loaded baseplate via the separate bag comprises:
using the handle and a single hand of the user, manually inserting the loaded baseplate into the separate bag; and
using the handle and the single hand of the user, removing the loaded baseplate from the bag.

* * * * *